March 1, 1966  H. KOCHALSKI ET AL  3,237,764
METHOD AND APPARATUS FOR TESTING ROD SHAPED ARTICLES
Filed Nov. 18, 1963                                10 Sheets-Sheet 10

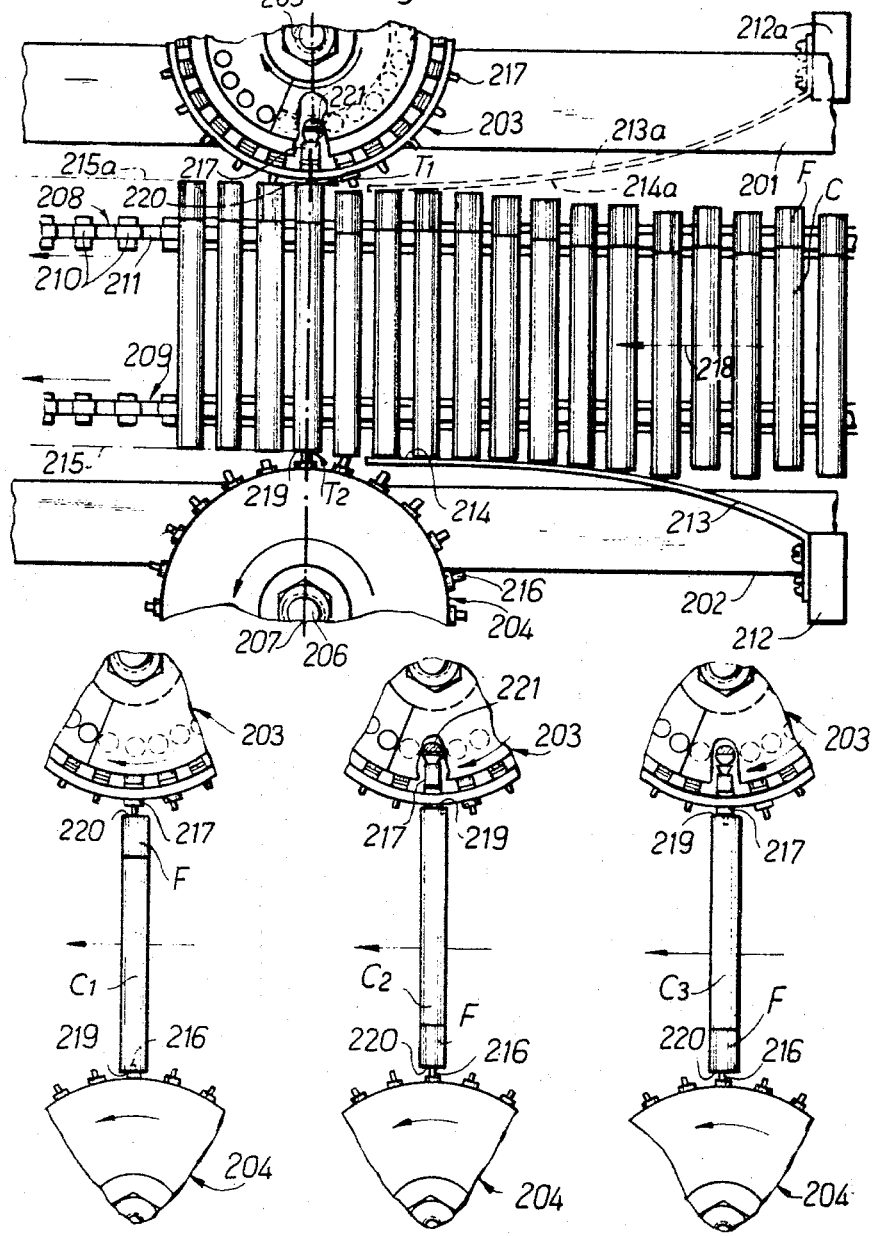

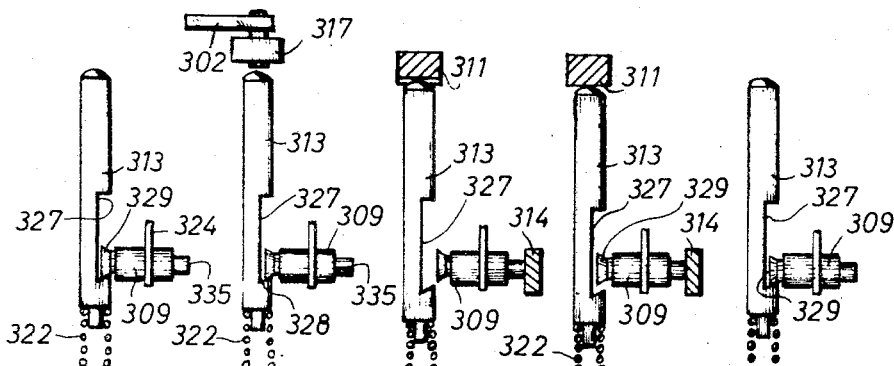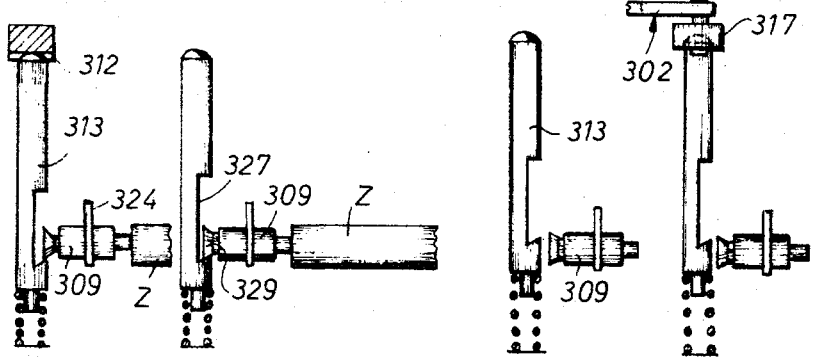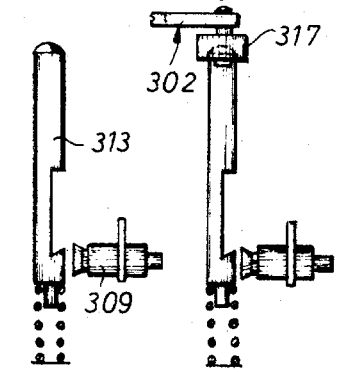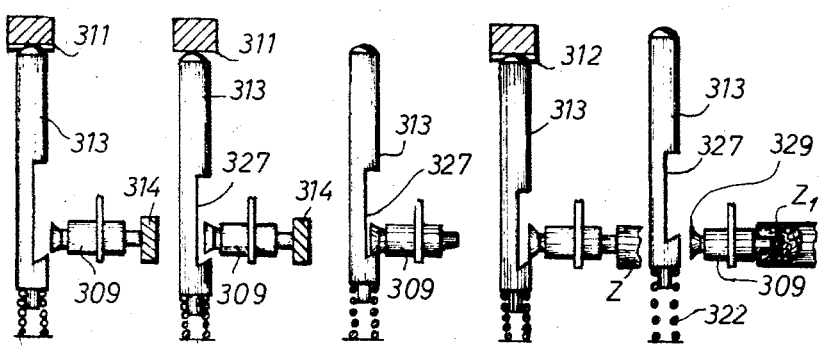

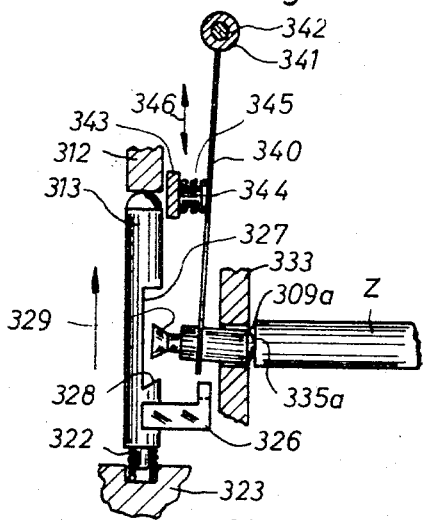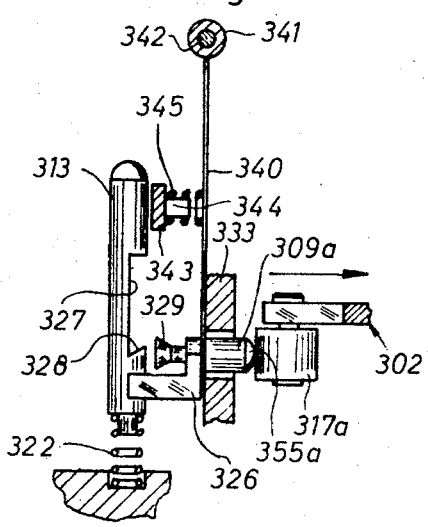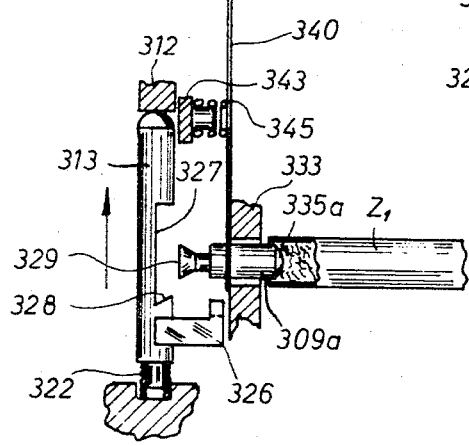

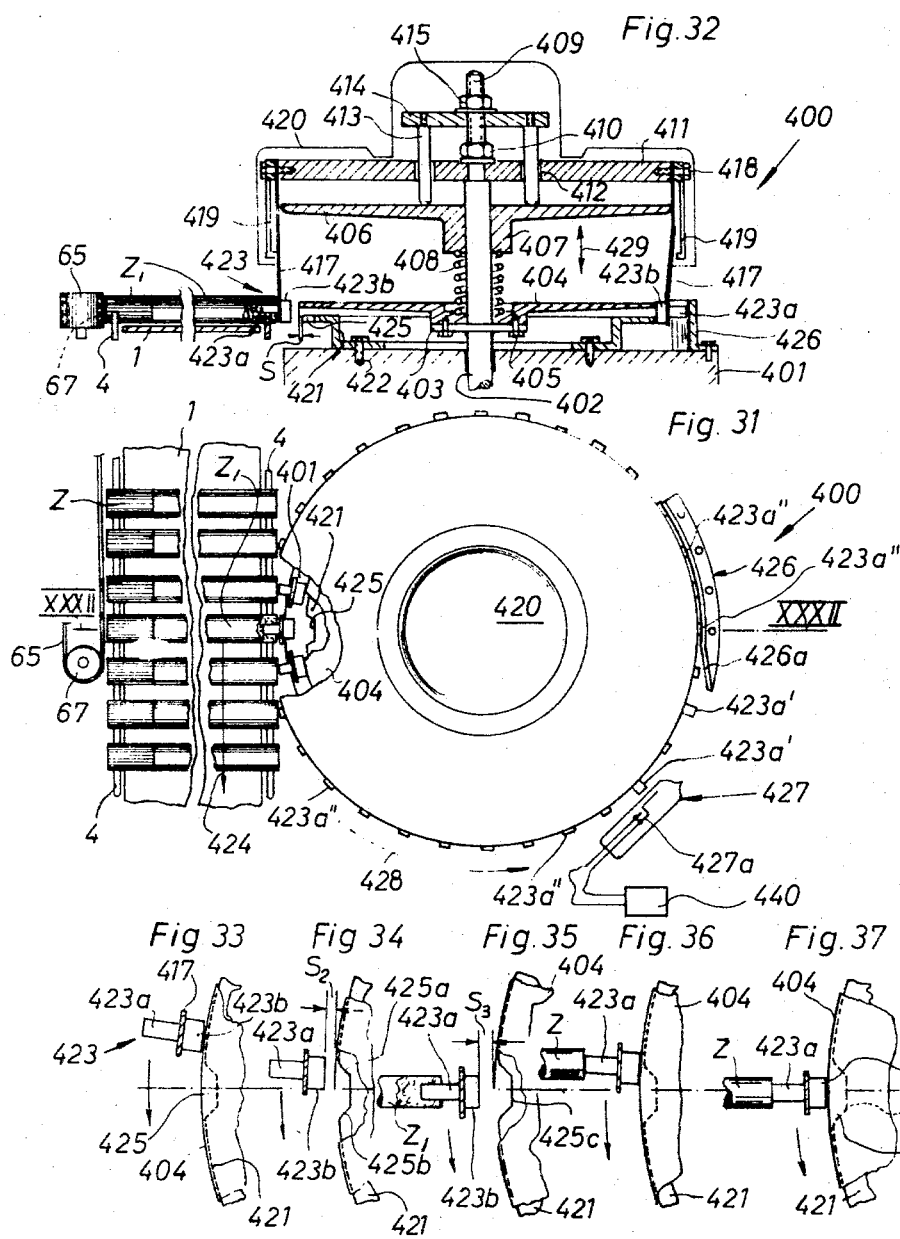

Inventors
Horst Kochalski    Willy Rudszinal
Hans Suck          Ludwig Rode
Harri David        Otto Erdmann
by Michael J. Striker
Atty

United States Patent Office 3,237,764
Patented Mar. 1, 1966

3,237,764
METHOD AND APPARATUS FOR TESTING ROD SHAPED ARTICLES
Horst Kochalski and Willy Rudszinat, Hamburg-Lohbrugge, Hans Suck, Hamburg-Neuengasse, Ludwig Rode, Neu-Bornsen, and Harri David and Otto Erdmann, Hamburg-Bergedorf, Germany, assignors to Hauni-Werke Korber & Co. K.G., Hamburg-Bergedorf, Germany
Filed Nov. 18, 1963, Ser. No. 325,213
Claims priority, application Great Britain, Apr. 28, 1961, 15,443/61; July 12, 1961, 25,228/61; Aug. 14, 1961, 29,241/61; Nov. 10, 1961, 40,305/61; Nov. 19, 1962, 43,620/62
59 Claims. (Cl. 209—88)

This is a continuation-in-part of our application Serial No. 190,091, filed April 25, 1962, now abandoned.

The present invention relates to automatic testing of mass-produced articles, and more specifically, to a method and an apparatus for testing the ends of cigarettes and other rod shaped or elongated articles for firmness. In its more specific aspects, our invention is concerned with the inspection of cigarettes for proper filling of their ends with tobacco, for the presence of a filter, and for similar properties which affect the firmness of the cigarette ends, and with the resistance of a cigarette to penetration by a sensing member moving relative to the cigarette in the direction of elongation of the cigarette.

Cigarettes are discharged from modern cigarette making machines at a very high rate of speed, which makes it impossible to inspect the cigarettes visually while they pass continuously from the cigarette making machine to packing equipment or to storage. It has therefore been customary to collect the cigarettes discharged from the machine over a certain period of time, and to inspect the collected cigarettes visually. More recently, methods have been developed for mechanizing the inspection of collected batches of cigarettes. Batchwise inspection, even when performed by automatic equipment, adds considerably to the time required for processing raw materials into a finished stored or packed product. Batchwise inspection adds a separate step to the manufacturing process.

An important object of the invention is to provide a method and an apparatus for continuous inspection of cigarettes and like rod shaped articles.

A more specific object of the invention is to provide a method of inspecting cigarettes in a continuous operation at the rate of output of ultramodern cigarette making machinery.

Another object of the invention is to provide a method of simultaneously inspecting both ends of a cigarette or a similar rod shaped article if such inspection is desired.

A concomitant object is to provide an apparatus suitable for performing the method of our invention.

A further object of the invention is to provide an apparatus which may be readily incorporated in to form a unit with continuous cigarette making machinery for the purpose of inspecting cigarettes as they are discharged from a cigarette making machine.

An additional object of the invention is to provide a testing apparatus for cigarettes and the like, which is fully automatic and does not require the attention of an operator.

An additional object of the invention is to provide a method of testing consecutive cigarettes and similar rod shaped articles in such a way that, in order to undergo a test, the articles need not cover a greater distance than in the absence of such test.

A further object of the invention is to provide an apparatus for testing cigarettes and similar rod shaped articles which is constructed and assembled in such a way that the articles leaving a cigarette machine or another machine in which they are produced need not be deflected from the path in which they normally advance toward a packing or storing station so that testing of articles in such apparatus does not cause any delays and does not necessitate lengthening of the path in which the articles are conveyed to their destination.

A still further object of the invention is to provide a testing apparatus wherein the testing or sensing members which come in actual contact with the articles to be tested need not perform any conveying function so that such members may be extremely sensitive to detect minute deviations from standard density, weight or other properties of the tested articles.

An ancillary object of the invention is to provide a testing apparatus which occupies little room so that it may be installed in existing machines for mass production of cigarettes, filter cigarettes, cigars, cigarillos, cheroots and similar rod shaped articles with a filler of variable density, weight and/or other characteristics.

Another object of the invention is to provide a testing apparatus whose sensing members are constructed, mounted and moved in such a way that they do not deform, destroy, deface or otherwise damage a satisfactory rod shaped article but which will invariably detect, memorize and cause removal of all defective articles at the speed at which such articles are manufactured and/or assembled in latest mass producing machines.

An additional object of the invention is to provide a testing apparatus of the just outlined characteristics whose sensing members will cause removal of defective articles at any desired point of the apparatus to facilitate collection, disposal and/or salvaging of such articles, and wherein the ejection or collection of defective articles does not interfere with orderly processing of satisfactory articles so that the testing operation does not affect the treatment of any acceptable products.

Another object of our invention is to provide a testing apparatus wherein a comparatively small number of sensing members is sufficient to test each and every article which is being discharged by a mass producing cigarette machine or a similar machine for the production of rod shaped articles.

Still another object of the invention is to provide a combined testing and classifying or ejecting apparatus which is constructed and assembled in such a way that its parts are not prone to malfunction, which may be rapidly and conveniently adjusted for testing of different types of rod shaped articles, wherein all parts are readily accessible for inspection, interchange and/or repair, and which is capable of long-lasting use without any supervision.

With these and other objects in view, the method of our invention in one of its aspects comprises the step of conveying cigarettes or other elongated rod shaped articles to be tested, preferably in uniformly spaced sequence and past a sensing or testing station. At least one end of each article is tested for resistance to a predetermined stress while the article is conveyed past the testing station. In the absence of such resistance a signal is generated, and the article sensed is displaced from the sequence in response to such signal.

The apparatus employed for carrying out the method briefly outlined above includes a sensing or testing unit, a classifying or ejecting unit, and may include conveyor means for conveying cigarettes or like rod shaped articles in uniformly spaced sequence to the testing unit, and thence to the classifying unit. The testing unit includes means for exerting a predetermined stress on an end portion of one of the articles tested, for sensing the resistance of the article to the stress, and for generating a signal responsive to lack of a predetermined minimum resistance of the article to the stress applied. The classifying unit includes means for displacing the referred to article responsive to the signal generated, relative to the conveyor means.

Other features and many of the attendant advantages of this invention will be readily appreciated as the same becomes better understood by reference to the following detailed description when considered in connection with the accompanying drawings, wherein:

FIG. 6 is a fragmentary plan view of a modified testing apparatus;

FIGS. 7, 8 and 9 illustrate the cooperation of certain elements of the testing apparatus of FIG. 6 with different articles being tested;

FIGS. 14 to 20 illustrate various stages in the position of a sensing member while this member orbits about a fixed axis into and out of engagement with a satisfactory article, the structure shown forming part of the testing unit which is illustrated in FIG. 10;

FIGS. 21–25 illustrate various stages in the position of a sensing member while this member orbits about a fixed axis into and out of engagement with a defective article;

FIG. 26 illustrates a sensing member in actual engagement with a satisfactory article;

FIG. 27 illustrates a sensing member in actual engagement with a defective article;

FIG. 28 is a fragmentary vertical section through a testing unit wherein the sensing members are suspended on comparatively rigid arms, one of the sensing members being shown in actual engagement with a satisfactory article;

FIG. 29 is a similar section showing the sensing member of FIG. 28 in outer end position at the time this member initiates ejection of a defective article;

FIG. 30 illustrates the sensing member of FIGS. 28 and 29 in engagement with a defective article;

FIG. 31 is a top plan view of a further testing unit wherein the sensing members are small magnets which are biased by springs;

FIG. 32 is an axial section as seen in the direction of arrows from the line XXXII—XXXII of FIG. 31;

FIG. 33 is a fragmentary top plan view of the testing unit shown in FIGS. 31 and 32, a sensing member being illustrated in a position it assumes while advancing toward the testing station;

FIG. 34 shows the sensing member of FIG. 33 at the testing station while the member is about to penetrate into the end face of an unsatisfactory article;

FIG. 35 illustrates the sensing member in actual engagement with an unsatisfactory article;

FIG. 36 shows a sensing member at the time it is about to engage a satisfactory article;

FIG. 37 illustrates the sensing member at the testing station in actual engagement with the end face of a satisfactory article;

Figure 38:
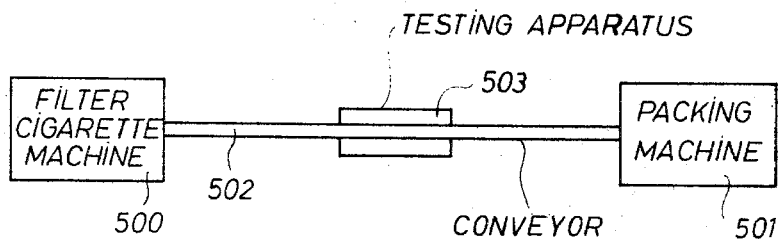
Figure 39:
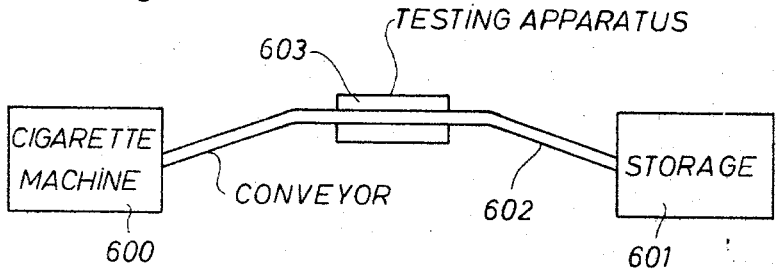

FIG. 38 is a diagrammatic side elevational view of a complete filter cigarette machine with a testing apparatus and with a packing machine, the testing apparatus being positioned between the two machines to test the ends of filter cigarettes which advance in a straight horizontal path; and FIG. 39 is a similar diagrammatic view showing the testing apparatus in a position adjacent to an arcuate path in which filterless cigarettes advance to storage.

Figure 1:
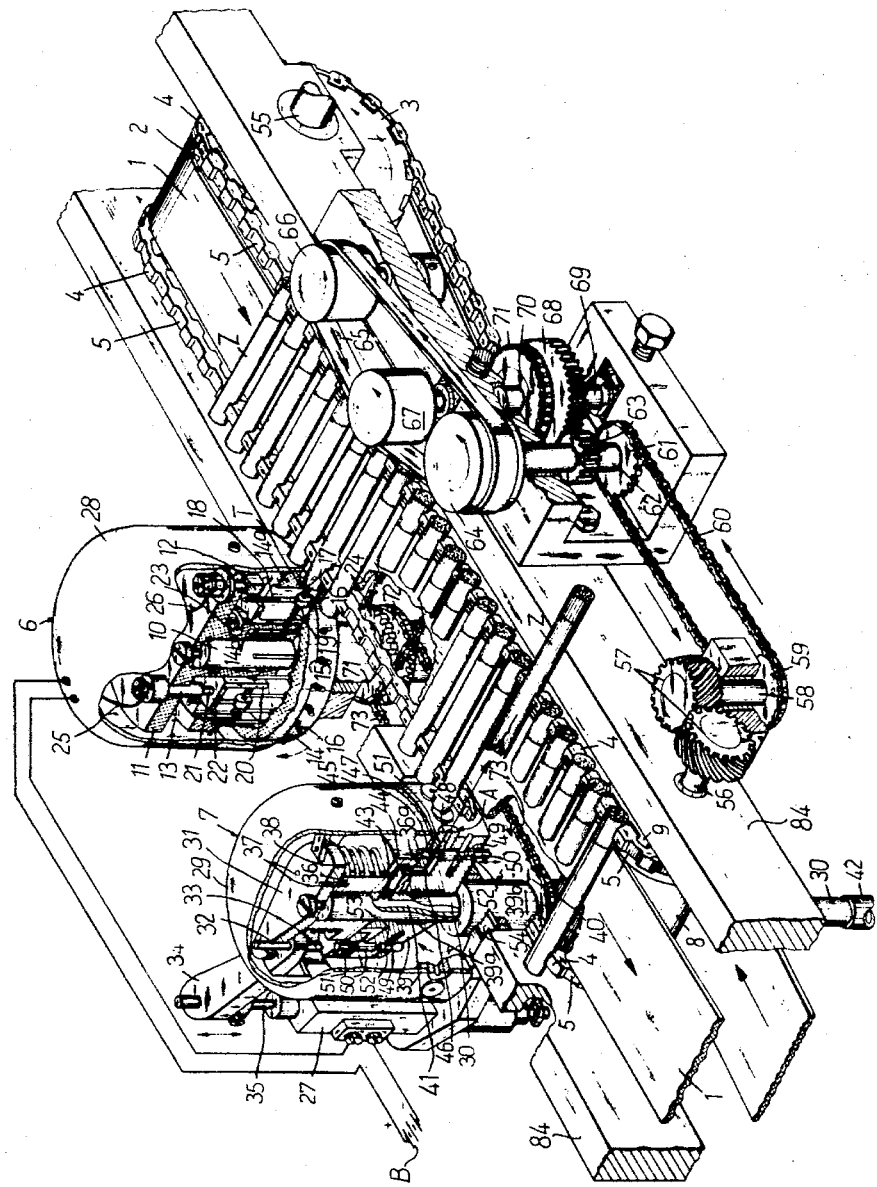
FIG. 1 is a perspective view of an automatic testing apparatus which embodies one form of the invention, with portions of the structure broken away to reveal internal working elements.

Referring to the drawings, and first to FIG. 1, there is shown a testing apparatus for rod shaped articles here illustrated as filter cigarettes. The testing apparatus comprises a sensing or testing unit 6, a classifying or sorting unit 7, a conveyor for sequentially presenting the filter cigarettes inspected to the sensing and classifying units, and a drive arrangement for synchronously driving the sensing unit, the classifying unit, and the conveyor.

The conveyor includes a support member here shown as a flat endless flexible belt 1 trained around a driven pulley 2 and guide pulleys 8 so as to form two substantially horizontal runs or decks. Only one guide pulley 8 is shown in the drawing. Two sprockets 3 are coaxially fastened to the two ends of the pulley 2 laterally adjacent to the belt 1. Two conformingly notched conveying members here shown as belts 4 of rubber or plastic are respectively trained around the sprockets 3 and around two toothed rims 9 on the guide pulley 8. Notches or recesses 5 on the outside of the rubber belts 4 are aligned with similarly shaped notches or recesses on the inside of the rubber belts, which engage corresponding projections provided on the sprockets 3 and rims 9. The notches 5 on the two rubber belts 4 are transversely aligned and dimensioned to receive the two longitudinal ends of filter cigarettes. The bottom of each notch 5 is located at or slightly below the level of the top face of the conveyor belt 1 so that the central portions of the cigarettes rest on the conveyor belt 1 and are guided by the rubber belts 4 in fixedly spaced sequence with their longitudinal axes substantially at right angles to the direction of conveyor movement which is indicated by arrows.

The operating elements of the testing unit 6 are supported on a stationary vertical shaft 10 which is laterally adjacent to one of the belts 4 and carries at its top end a flange member 11 of insulating material. Two fixed contact elements 12 and 13 project downwardly from the flange member 11 at opposite sides of the shaft 10 in a plane passing through the axis of the shaft 10 and perpendicular to the direction of conveyor movement.

An annular carrier 14 of insulating material is rotatable on the shaft 10 in fixed axial position. The carrier 14 has an outer tubular portion 14a, an inner tubular portion 14b and a circular disk portion spacedly and coaxially connecting a central axial part of the inner tubular portion 14b to the lower end of the outer portion 14a. Aligned radial bores 15 in the tubular portions 14a, 14b are uniformly distributed over the circumference of the carrier 14 and slidingly receive respective sensing members here shown as pins 16. Each sensing pin carries a fixed collar 17 in the annular space between the two tubular portions of the carrier 14. A contact rod 18 fastened to the collar 17 projects upwardly therefrom to the axial level of the fixed contact element 12. A light helical spring 19 on each contact pin 16 urges the corresponding collar 17 radially outward toward the tubular portion 14a, thus urging the sensing pins 16 outward of the respective bores 15.

A flange bushing 20 of conductive metallic material is contiguously fastened to the inner tubular portion 14b of the carrier 14. Its tubular portion has openings in line with the bores 15 for passage of the sensing pins 16. The springs 19 make abutting contact with the bushing 20. The flange portion 22 of the bushing 20 is in electrical contact with a spring-loaded carbon brush 21 on the contact element 13.

The annular carrier 14 is rotatably mounted on the shaft 10 by means of two bearings, only one ball bearing 23 being shown interposed between the inner tubular portion 14b and the hub portion of the flange member 11. Rotation of the carrier 14 on the shaft 10 is caused, in a manner more fully discussed hereinafter, by a sprocket 24 which is coaxially fastened to the lower end of the inner tubular portion 14b.

Conductors 25 and 26, attached to the contact elements 12, 13, connect the testing unit 6 with the classifying unit 7. They pass through a casing 28 which forms a protective cover or cap for the upper portion of the testing unit 6.

A major portion of the classifying unit 7 is similarly housed in a cover or cap 29 adjacent the conveyor, and spaced from the testing unit 6 in the direction of conveyor travel. The movable elements of the classifying unit are supported on a stationary hollow upright shaft 30 which is fixedly fastened to the conveyor frame 84. An elongated plate 31 fixedly mounted on the top end of the shaft 30 has an axial guide bore 32 spaced from the axis of the shaft 30 in a direction away from the conveyor. A push rod 33 is slidably guided in the bore 32.

The rod 33 is fastened to an arm 34 attached to the armature 34 of a solenoid 27. The solenoid is connected with the testing unit 6 by the conductors 25, 26. When the conductors 25, 26 are connected by the testing unit 6, the solenoid 27 is energized, and the armature 35 is attracted downward. In the absence of energizing current, the armature is displaced upward into the position of FIG. 1 by means of a return spring (not illustrated).

A flanged sleeve 36 is axially slidable on the shaft 30, and is secured against rotation by locating pins 37 fixedly fastened to the sleeve 36 and axially slidable in corresponding bores of the plate 31. A strong helical compression spring 38 interposed between the plate 31 and the flange portion of the sleeve 36 urges the same to move downwardly away from the plate 31 into sealing engagement of its bottom face 36a with the radial top face of a carrier ring 39 which is rotatably supported on the shaft 30 on a needle bearing 39a. The ring 39 is integral with a hub 39b. A sprocket 40 mounted on the hub 39b causes rotation of the ring 39 on the shaft 30.

The axial cavity 41 of the shaft 30 communicates with a source of compressed air, such as a pump or storage tank, through a pipe 42 fastened to the lower end of the shaft 30, and with a radial bore 43. The bore 43 is aligned in all operating positions of the apparatus with a radial duct 44 in the flanged sleeve 36 which has an orifice 45 in the bottom face 36b of the sleeve 36. During rotation of the ring 39 about the axis of the shaft 36, the orifice 45 travels in a circular path on the top face of the ring 39.

Axial bores 46 extend from this top face at uniformly spaced points of the circular path toward passages 47 within the ring 39 which lead radially outward and terminate in nozzles 48 leading radially out of the cylindrical face of the ring 39. The circumferential spacing of the nozzles 48 is approximately equal to that of the sensing pins 16 in the testing unit 6, and to the center-to-center spacing of the notches 5 on the rubber belts 4. The ring 39 projects radially beyond the flange portion of the sleeve 36, and the projecting annular part of the ring 39 is provided with axial bores 49 respectively intersecting the radial passages 47.

A generally cylindrical valve pin 50 is slidably retained in each bore 49. The pins each have three annular grooves in their cylindrical faces. Two grooves 52 are arranged adjacent each other in the lower part of the pin. These grooves are capable of alternatively receiving spring-loaded detents 53 whose force is sufficient to secure the valve pin in two respective positions against displacement by gravity or vibration. A third groove 51, somewhat wider than the grooves 52, is aligned with the corresponding passage 47 when the valve pin 50 is held in its lower axial position by the detent 53. When the detent enters the other groove 52, the groove 51 is above the passage 47, and the pin 50 blocks the passage. When in the lower axial position, the valve pin 50 projects downwardly from the ring 39. A cam 54 is fastened to the conveyor frame in the path of the valve pins adjacent the conveyor, and ahead of a position of vertical alignment of the pins with the push rod 33 for returning all valve pins 50 from their lower to the higher position secured by the detents 53.

The testing unit 6, the classifying unit 7, the conveyor, and their accessories are driven in unison by a motion transmitting train coupled to the main drive shaft 55 which is connected to a prime mover in a conventional manner, not illustrated. The drive shaft 55 is fixedly fastened to the conveyor pulley 2 and to the sprockets 3 which transmit rotary action to the guide pulley 8 by means of the belts 1 and 4. The fixed shaft 56 of the pulley 8 rotates a countershaft 58 by means of bevel gears 57. Another countershaft 62 is rotated by meshing engagement between a chain 60 and respective sprockets 59, 61 on the countershafts 58, 62.

A drive pulley 64 mounted on the vertical countershaft 62 drives a flat and relatively narrow guide belt 65 which is trained around two idler pulleys 66, 67. These idler pulleys guide the belt 65 in a path adjacent to that rubber belt 4 which is remote from the testing unit 6. The path of the belt 65 extends obliquely to the direction of conveyor travel at a small acute angle. The pulley 66 is located ahead of the testing unit 6 in the direction of conveyor travel, and the pulley 67 faces the testing unit across the width of the conveyor belt 1. The guide belt 65 approaches the conveyor as it moves from pulley 66 to pulley 67.

A pinion 63 on the countershaft 62 meshes with a spur gear 68 on a radially adjustable countershaft 69. A sprocket 70 on the shaft 69 drives a chain 71 which is trained around the aforementioned sprocket 24 to rotate the annular carrier 14 on the shaft 10. A sprocket 72 secured to the sprocket 24 and a chain 73 transmit the movement of the drive shaft 55 to the sprocket 40 of the classifying unit 7.

The aforedescribed testing apparatus operates as follows:

Filter cigarettes Z are fed onto the conveyor belt 1 in such a manner that the ends of each cigarette are accommodated in respective notches 5 aligned transversely of the direction of conveyor movement and providing a receptacle for the cigarettes. The end of the cigarette which is to be tested for proper consistency passes near the testing unit 6. The method of feeding the cigarettes to the belt 1 is position will be in a direction transversely away from the testing unit. Deviating cigarettes thus make contact with the guide belt 65 as they travel toward the testing unit 6. The transmission ratio between the drive shaft 55 and the belts 1, 4, 65 is such that the belts travel at speeds having equal components in the direction of conveyor travel. The belt 65 thus gently moves the cigarettes into a position of desired transverse alignment with the testing unit 6. The shaft supporting the pulley 67 is adjustable transversely of the conveyor, thus permitting the apparatus to be used with filter cigarettes and filterless cigarettes or similar rod shaped articles of different length.

The location T on the conveyor may be termed the sensing or testing station of the apparatus. At this location, the axis of the shaft 10 is spaced at right angles from the conveyor axis, and the direction of conveyor movement is tangential to the movement of the carrier 14 and of the sensing pins 16 which are slidably supported therein. The spacing of the sensing pins is equal to the spacing of the cigarettes on the conveyor, and the rotary speed of the carrier 14 is such as to make the circumferential speed of the projecting pin ends or tips equal to the translatory conveyor speed. As the cigarettes move past the testing station, the free ends or tips of the sensing pins move toward the cigarettes in the direction of the longitudinal cigarette axis.

The cigarette shown at the testing station T in FIG. 1 is filled properly so as to offer more than the minimum resistance required to prevent penetration by the corresponding sensing pin 16. The spring 18 is compressed while the contact rod 18 travels past the fixed contact element 12. The energizing circuit of the solenoid 27 remains open at the switch between the element 12 and rod 18, and the arm 34 with its push rod 33 maintains its inoperative position illustrated in FIG. 1.

The classifying station A of the apparatus is located at that point along the conveyor where the axis of the shaft 30 is perpendicularly spaced from the longitudinal conveyor axis. The classifying station A is spaced from the testing station T by ten notches 5 in the belts 4, and by an equal number of cigarettes. A defective cigarette is seen at the classifying station in the process of being ejected from the conveyor.

When this cigarette, whose front end is split and partly emptied of tobacco, passed the testing station, the corresponding sensing pin 16 was axially pushed into the cigarette by its spring 19 so that the solenoid 27 was energized while the cigarette moved through the testing station, and while the corresponding rod 18 touched the contact element 12 to close the switch. The resulting downward movement of the armature 35 brought the push rod 33 to bear on a valve pin 50 which at that time was spaced ten places from alignment of its passage 47 and bore 46 with the single orifice 45 communicatiing with the compressed air pipe 42.

The synchronized drive arrangement causes nozzle 48 to be presented at the classifying station whenever a cigarette Z passes. While the defective cigarette traveled on the conveyor a distance corresponding to ten notches in the belts 4, the corresponding passage 47 with its downwardly displaced valve pin 50 traveled in an arcuate path from a position of axial alignment with the push rod 33 to the position illustrated, in which the open passage 47 is located at the classifying station and in communication with the compressed air pipe 42. As the defective cigarette reaches the classifying station, a brief blast of air from the aligned nozzle 48 dislodges the cigarette from the conveyor and drops it into a suitably arranged container, not in itself relevant to this invention, and not shown.

The apparatus illustrated is capable of many modifications which will readily suggest themselves to those skilled in the art. A single guide belt 65 has been illustrated and described, but an additional guide belt may be installed at the other side of the conveyor if necessary. Devices other than moving belts may be employed to position the cigarettes transversely of the longitudinal conveyor axis, and to provide backing at the testing station opposite the testing unit against the axial force of a sensing pin 16.

The classifying unit has been shown to be arranged on the same side of the conveyor as the testing unit, and such an arrangement is preferred but not necessary. The spacing of the units along the conveyor may be chosen at will within the area occupied by the apparatus to delay action of the classifying unit. There is at least one ejector nozzle or its equivalent for each cigarette on the conveyor section between the two units. While the maximum spacing of the units is thus limited, their necessary minimum spacing is zero. In other words, the testing station may coincide with the classifying station, and the two units may be combined. The push rod 33 is then aligned with the valve pin 50 in that passage 47 which communicates with the compressed air pipe 42 and whose nozzle 48 is directed against the cigarette being tested by a sensing pin 16.

In such a combination unit, the electromechanical features of the apparatus shown in FIG. 1 may be omitted, and valve pin 50 may be displaced downward by a push rod actuated by a mechanical linkage connected to an abutment member which is struck by the rod 18 when the latter is not displaced by the resistance of a cigarette end. This may be further modified by providing the valve pin 50 with a spring which tends to move the valve pin into its lower, passage-opening position, and by linking the rod 18 to the detent 53 so that the detent will be withdrawn by the linkage, and the valve opened by spring power. The pressure transmitted between a sensing pin 16 and the cigarette may thus be held quite low.

It has been found, however, that the electromechanical apparatus illustrated is normally capable of operation at higher speed than purely mechanical systems of the type described. The springs 19 may be made extremely soft in an electromechanical system so that any permanent deformation of the body or filler of tobacco in the cigarette by the pressure of the sensing pin 16 is safely avoided.

Regardless of the manner in which the passage opening movement of the valve pin 50 is brought about, the valve pin is returned to its upper, passage-closing position by the cam 54 before it again reaches a position of alignment with the push rod 33 or other mechanism responsive to the condition tested by the sensing pin 16.

An automatic testing apparatus based entirely on mechanical operation and yet capable of high speed is illustrated in FIGS. 2 to 5 which show a second embodiment of the invention in plan view, in elevational section through the testing unit, and in partial front elevation to show the classifying unit. The testing apparatus is equipped with a conveyor and a drive arrangement identical with those shown in FIG. 1, and therefore largely omitted from the showing of FIGS. 2 to 5.

Figure 2:
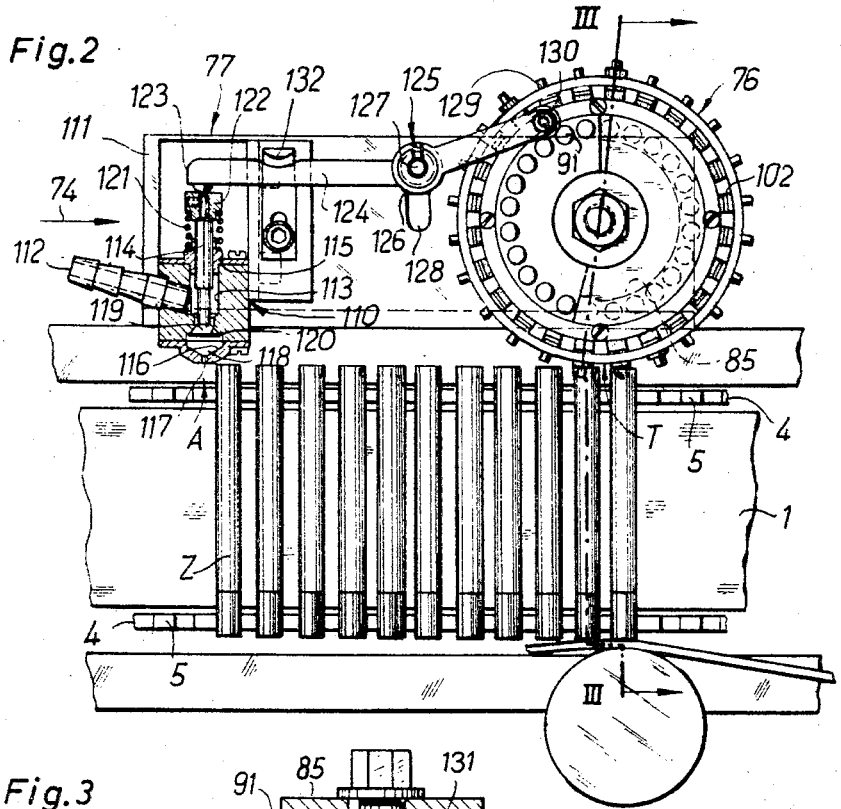
FIG. 2 is a fragmentary plan view of another automatic testing apparatus which is similar to the apparatus of FIG. 1.

FIG. 2 shows portions of the conveyor belt 1 and of the rubber belts 4 with their notches or recesses 5 in which the ends of cigarettes Z are retained. A sensing or testing unit 76 and a classifying or ejecting unit 77 are arranged on the same side of the conveyor at a testing station T and a classifying station A respectively. They are spaced from each other a distance corresponding to a conveyor section occupied by ten juxtaposed filter cigarettes Z.

The testing unit 76 is mounted on a stationary upright shaft 80. The shaft has an integral collar 81 which is seated on an angle iron 82 extending along the frame 84 of the conveyor. The lower end of the shaft 80 is threaded and passes through a slot 83 elongated transversely of the direction of conveyor movement. The shaft 80 is adjustably secured in the slot 83 by a nut, thus permitting the entire testing unit to be moved toward and away from the conveyor for adaptation to filter cigarettes and filterless cigarettes or similar rod shaped articles of different length.

The free top end of the shaft 80 carries a stationary cylindrical cam 85. The other elements of the sensing unit are supported on a rotary carrier 86 journaled on the shaft 80 by means of two axially spaced antifriction bearings 87, 88. The lower end of the rotary carrier 86 carries sprockets 89 which permit the carrier 86 to be rotated on the shaft 80 in synchronism with certain other elements of the testing apparatus in the same manner as described above with respect to the first embodiment of our invention.

Twenty-four axial bores 90 are spacedly aligned in the carrier 86 in a circle about the axis of the shaft 80. The bores are cylindrical and slidably receive corresponding control pins 91 of generally cylindrical shape. A flat annular plate 92 seals the bottom ends of the bores 92. A compression spring 93 is interposed in each bore between the plate 92 and the corresponding control pin 91, and is centered on the respective control pin by an axial cylindrical projection 94 of reduced diameter.

The upper portions of control pins 91 extend outside the rotary carrier 86 and are surrounded by a ring member 95 fixedly mounted on the carrier 86 and formed with an annular recess receiving short stop pins 96 which project radially from the respective control pins 91. Longitudinal movement of each control pin 91 is limited by abutment of the associated pin 96 against the horizontal walls bounding the respective recesses in the ring member 95.

Each control pin 91 is formed with a lateral cutout 97 at a level below the respective stop pin 96. A locking face 98 in the lower portion of each cutout 97 is obliquely inclined downward and inward of the respective control pin 91 for a purpose which will become presently apparent.

The rotary carrier 86 has twenty-four radial bores 99 aligned in common axial planes with respective control pins 91, and on a level adjacent the cutout 97 of the corresponding control pin. A generally cylindrical sensing member here shown as a pin 100 is radially slidable in each bore 99. An outer terminal portion of each sensing pin 100 projecting from its bore 99 is of reduced diameter. An annular groove 101 circles the central portion of each sensing pin 100 and receives a portion of a weak leaf spring 102 secured to an outer wall portion 103 of the rotary carrier 86. The springs 102 bias the respective pins 100 radially outward of the bores 99. Even small inward pressure on the outer terminal portion or tip of a sensing pin 100 displaces this pin radially inward against the bias of the respective leaf spring 102.

The inner end portion of each sensing pin 100 has the shape of the frustum of a cone coaxial with the cylindrical remainder of the sensing pin 100 to which the smaller base of the frustum is attached. The slope 104 of the conical surface conforms to that of the oblique locking face 98 in the cutout 97 of the corresponding control pin 91.

The classifying unit 77 comprises a valve assembly 110 arranged on a support 111 which is adjustably fastened on the angle iron 82 in the same manner as the shaft 80. The valve assembly 110 may thus be moved toward and away from the path of the filter cigarettes Z on the conveyor. An elongated horizontal bore 113 in the valve assembly 110 extends substantially at right angles to the direction of conveyor movement. It communicates with a source of compressed air, not shown, by a conduit 112. One end of the bore 113 is sealed by a sleeve 115 in which the stem 114 of a poppet valve is guided longitudinally of the bore 113. The opposite end of the bore 113 adjacent the conveyor is covered by a cap 116 having a central orifice 117 constituting an air nozzle from which a jet of air may be released toward the conveyor. A beveled valve disk 119 on the stem 114 is shaped to conform to an annular valve seat 120. When engaging the seat 120, the valve disk 119 prevents communication between the compressed air conduit 112 and the front portion 118 of the bore 113 adjacent the nozzle 117. The free end of the valve stem 114 projects outward of the bore 113 and carries a fixed collar 122. A compression spring 121 is interposed between the collar 112 and the sleeve 115 to bias the valve disk 119 into engagement with the valve seat 120.

The operative connection between the testing unit 76 and the classifying unit 77 comprises a lever 125 pivoted on a fixed vertical shaft 127. The shaft 127 is fastened to the angle iron 82 by nuts engaging a lower threaded portion of the shaft in a manner not illustrated in detail, but identical in all relevant aspects to the fastening of the shaft 80 shown in FIG. 2. The position of the shaft 127 is adjustable in an elongated aperture 128 to maintain engagement between the lever 125 and the testing and classifying units in differently adjusted positions of the latter.

The lever 125 includes a sleeve 126, an arm 124 which extends from the sleeve toward the classifying unit 77, and an arm 129 which extends toward the testing unit 76. A motion transmitting roller 123 on the free end of the arm 124 abuts against the collar 122 of the valve stem 114. The spring 121 normally biases the arm 124 into abutting engagement with a stop 132 which is adjustably fastened to the angle iron 82. A roller 130 on the arm 129 normally is disposed above the axial bores 90 in the rotary member 86 of the testing unit.

The testing apparatus illustrated in FIGS. 2 to 5 and described above operates as follows:

Filter cigarettes Z the ends of which are received in the notches 5 of the belts 4 travel sequentially past the testing station T while being held at uniform distances from each other. The rotary speed of the testing unit 76 is such that the outer terminal portions of the sensing pins 100 travel at the same speed as the cigarettes Z when the path of the cigarettes is approximately tangential relative to the arcuate path of the sensing pins 100. The plane of the sensing pins 100 is also the plane of the cigarettes Z.

If the end of a cigarette facing the testing unit 76 is not properly filled with tobacco, the reduced terminal portion or tip of a sensing pin 100 can penetrate into the end of the cigarette. Such penetration is limited by abutment of the cigarette against a shoulder at the base of the reduced terminal portion. The sensing pin 100 remains in the position illustration in FIG. 3.

Figure 3:
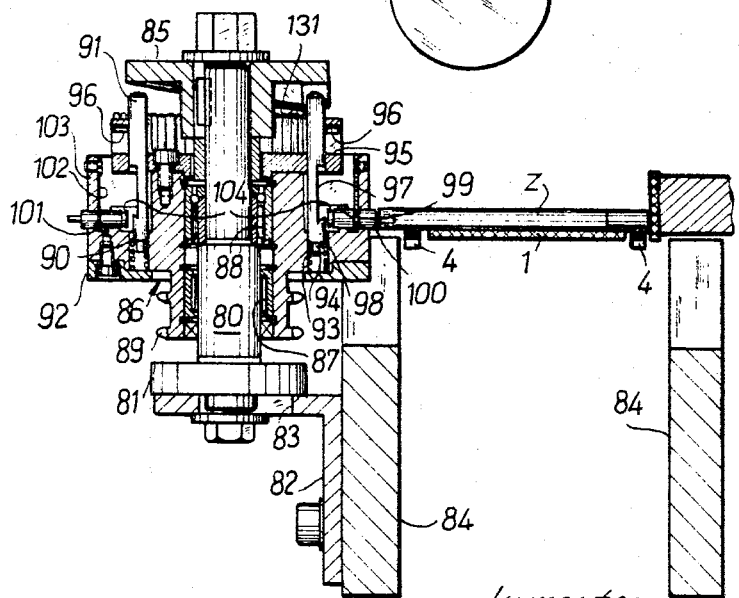
FIG. 3 shows the testing unit of the apparatus shown in FIG. 2 in section along the line III—III in the position assumed while sensing a defective article.

The cyclindrical cam 85 has an annular operating cam face 131 which is obliquely inclined relative to the axis of the shaft 80. The lowest point of the cam face 131 is ahead of the testing station T in the direction of rotation of the rotary carrier 86. The control pins 91 are biased by the springs 93 toward the cam face 131 as far as permitted by the stop pins 96. While passing through a plane transverse of conveyor movement and aligned with the testing station T, the control pins 91 are moving upward along the cam face 131 as seen in FIG. 3. When the corresponding sensing pin 100 is in its operative position in which its terminal portion penetrates into a cigarette, the locking face 98 in the cutout 97 of the control pin 91 clears the frustoconical inner end portion of the sensing pin 100, and the control pin 91 can be raised by its spring 93 to an active position as fas as the stop pin 96 and the cam face 131 permit.

The rotary carrier 86 of the testing unit 76 rotates in a clockwise direction, as viewed in FIG. 3. The control pin 91, raised by its spring 93 to the active position, comes within the range of the roller 130 after ten sensing pins 100 have passed through the testing station T. Because of the synchronized drive arrangement of the unit 76 and the conveyor belts 1 and 4, the sensed cigarette which did not resist penetration by a sensing pin 100, and thus triggered upward movement of the associated control pin 91 moves along the conveyor a distance corresponding to the spacing of ten notches 5, and is located in front of the nozzle 118 at the classifying station A when the corresponding control pin 91 reaches the roller 130. The raised control pin 91 strikes the roller and deflects it radially outward of the axis of the shaft 80, thereby urging the arm 124 against the collar 122, and briefly lifting the valve disk 119 from its seat 120. A blast of compressed air from the nozzle 118 displaces the defective cigarette from the conveyor transversely of the direction of conveyor movement, and in the direction of elongation of the cigarette.

When a properly filled cigarette passes the testing station T, the resistance of its tobacco against penetration by the terminal portion of a sensing pin 100 is sufficient to overcome the tension of the leaf spring 102, and to shift the inner end portion of the sensing pin into the cutout 97 of the corresponding control pin 91. During the upward movement of the control pin while passing through the testing station, the locking face 98 in the cutout 97 engages the frustoconical end portion of the sensing pin. Eventually, full latching engagement is reached between the control pin 91 and the coordinated sensing pin 100 in a position in which the former is held depressed and the latter is withdrawn inward of its operative position. When the depressed control pin 91 travels past the roller 130, its top end is too low to deflect the lever 125. The nozzle 118 remains inactive when the properly filled cigarette passes the transverse plane of the classifying station A. When the depressed control pin 91 again approaches the testing station T, its top end is engaged by the low portion of the cam face 131. The control pin 91 is further depressed until the frustoconical end portion 104 of the sensing pin 100 clears the locking face 98, whereupon the sensing pin 100 is returned to its operative position by the leaf spring 102, and is ready for sensing another cigarette while passing the testing station T.

Figure 4:
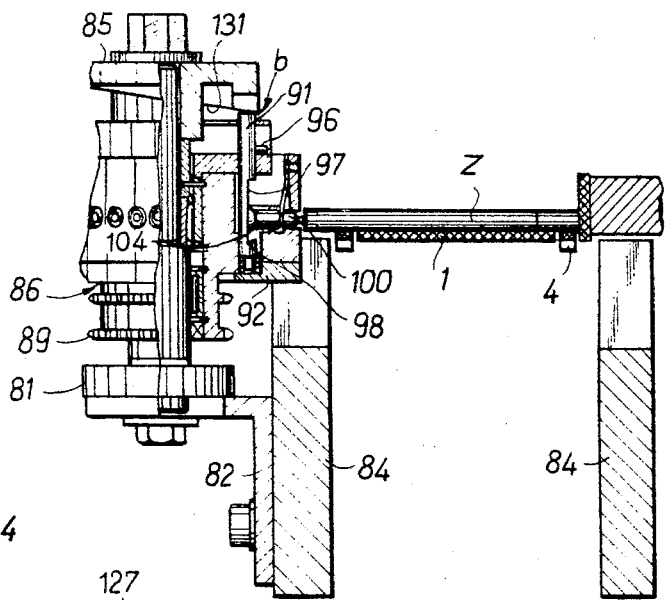
FIG. 4 illustrates a portion of the testing unit in the view of FIG. 3 and in a position its parts assume while sensing a satisfactory article.
Figure 5:
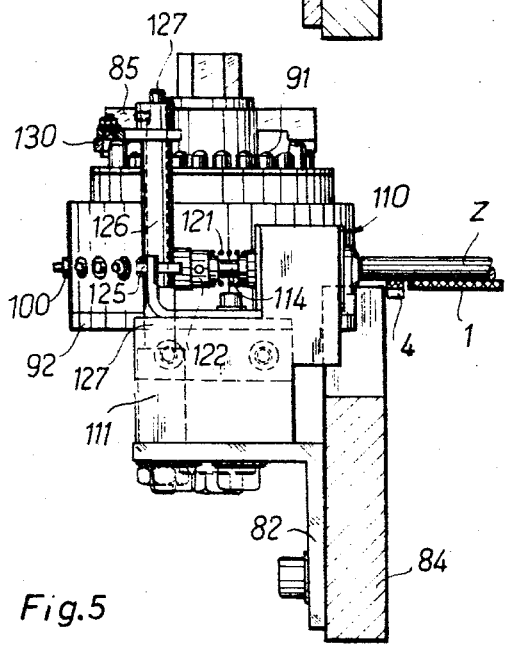
FIG. 5 shows the classifying unit of the testing apparatus of FIG. 2 in a front elevational view as seen in the direction of the arrow 74 shown in FIG. 2.

The relative position of the sensing pin 100 and the control pin 91 induced by sensing of a properly filled cigarette at the testing station T is illustrated in FIG. 4.

The embodiment of the invention illustrated in FIGS. 2 to 5 does not rely on electromagnetic devices, and is capable of inspecting cigarettes at a rate unattainable with apparatus which must rely for operativeness on the magnetization of a ferromagnetic core. Such magnetization requires a span of time which is very brief, yet significant for the operating cycle of a cigarette testing device of this invention which must keep in step with a cigarette making machine discharging 1500 cigarettes or more per minute.

As shown, the cigarettes Z illustrated in FIGS. 1 to 5 are equipped with filter mouthpieces. It is unnecessary to test more than one end of such cigarettes for proper filling with tobacco, but it will readily be appreciated that two testing units arranged on opposite sides of a conveyor and cooperating with two classifying units permit both ends of regular or king size filterless cigarettes to be checked. If so desired, two testing units of the same construction as the unit 76 may be connected with a single classifying unit 77 by a lever which differs from the lever 125 by an additional arm cooperating with the added testing unit in the same manner as the arm 129 cooperates with the testing unit 76.

In the embodiments of the invention described hereinabove, the cigarette being sensed at the testing station is backed by a guide belt 65 and by an idler pulley 67 around which the belt 65 is trained. A particularly advantageous backing arrangement is illustrated in FIGS. 6 to 9.

The apparatus illustrated employs a conveyor and synchronizing drive of the type illustrated in FIG. 1 and not requiring further detailed description. It also uses a classifying station identical with that illustrated in FIGS. 2 to 5, and not shown in FIGS. 6 to 9.

FIG. 6 shows a plan view of a portion of a conveyor substantially identical with that seen in FIG. 1, and comprising two horizontal frame members 201, 202. A sensing or testing unit 203 identical with the testing unit 76 shown in FIGS. 2 to 5 is mounted on the frame member 201 by means of a stationary shaft 205. A chain-dotted line 207 indicates a plane passing through the axis of the shaft 205 and perpendicular to the direction of conveyor movement shown by the arrow 218.

A shaft 206 is fixedly mounted on the frame member 202, and its axis extends in the plane of the line 207. A rotary backing member 204 identical in external configuration with the carrier of the sensing unit 203 is mounted on the shaft 206, and is connected to the conveyor drive by chains and sprockets (not shown) for rotation in unison with the rotary portion of the unit 203. The cylindrical outer face of the rotary backing member 204 carries fixed pins 216 identical in shape and spacing with the sensing pins 217. The pins 217 are radially slidable in the testing unit 203 to trigger an ejection signal for the cooperating classifying unit (not illustrated).

Two notched belts 208, 209 having alternating teeth 210 and notches 211 are trained around driver and idler pulleys in the manner illustrated in FIG. 1 to carry filter cigarettes C received in the notches 211 past two testing stations T1 and T2 at opposite sides of the conveyor in the transverse plane indicated by the line 207. The rotation of the testing unit 203 is synchronized with that of the backing member 204 in such a manner that a sensing pin 217 of the former passes the line 207 simultaneously with each fixed pin 216 of the latter.

The cigarettes C which are not perfectly aligned in the direction of conveyor movement when first placed on the conveyor, are properly positioned for testing by two guide rails 213, 213a having respective end portions fastened to brackets 212, 212a on the frame members 202, 201. The rail 213 is of resilient spring steel whereas the rail 213a is of more rigid material. In the relaxed condition of the rail 213, the opposite faces 214, 214a of the rails define a wedge shaped space on the level of the notches 211 which tapers in the direction of conveyor movement to a width only slightly narrower than the length of the cigarettes C that are being tested. The free ends of the faces 214, 214a are located on and are respectively tangential to lines 215, 215a which are parallel to the direction of conveyor movement and are located just ahead of the testing stations T1, T2.

The apparatus illustrated in FIG. 6 operates as follows:

Regardless of the initial transverse position of the cigarettes C in the respective notches 211, the two end faces 219, 220 of each cigarette which extend longitudinally of the conveyor are aligned along the lines 215, 215a by the faces 214, 214a of the guide rails 213, 213a when the cigarettes reach the testing stations T1, T2.

The transverse spacing of the testing unit 203 and of the rotary backing member 204 relative to the conveyor is such that the paths of the free ends of the sensing pins 217 and the fixed pins 216 at the respective stations are nearer to each other than the lines 215, 215a, and intersect both lines in an approximately symmetrical pattern.

The cigarettes C are of the filter type in which a paper wrapper is normally filled with tobacco from end face 219 to a filter F which forms the end face 220. The cigarette C which in FIG. 6 extends along the line 207, with its end faces at the testing stations T1, T2, has a tobacco filling at the end face 219 which is firm enough to resist penetration by the fixed backing pin 216. The backing pin therefore has laterally displaced the cigarette from its aligned position between the lines 215, 215a toward the axis of the shaft 205. The firm end face 220 of the filter F has pushed the corresponding sensing pin 217 inward of the testing unit 203, and thereby arrested the axial movement of a control pin 221 as described above with reference to FIGS. 2 to 5. When this cigarette will pass the classifying station, it will not be ejected from the respective notches 211.

FIG. 7 shows a portion of the apparatus of FIG. 6 including the testing stations in the process of testing a cigarette C1 having an unsatisfactory tobacco filling at the end face 219. The bias upon the associated spring-biased sensing pin 217 resists radial movement of the pin sufficiently to move the cigarette C1 from its aligned position toward the axis of the backing member 204. The soft end face 219 permits the fixed pin 216 to penetrate inward of the cigarette C1.

Passage of the sensing pin 217 through the testing station in its operative position, that is, the position of maximum outward projection, triggers a delayed signal to the classfying station in the manner described hereinabove. The defective cigarette C1, on leaving the testing stations T1, T2, is displaced from its aligned position toward that side of the conveyor on which the backing member 204 is located. A cigarette laterally displaced due to its defective filling is illustrated in FIG. 6 in the first pair of notches 211 adjacent the testing stations in the direction of conveyor movement. This displacement facilitates eventual removal of the defective cigarette from the conveyor by an air blast at the classifying station.

FIGS. 6 and 7 illustrate the operation of the automatic testing apparatus of FIG. 6 with filter cigarettes positioned with their filters F facing the testing unit. The apparatus operates in an entirely analogous manner when the filters F face the backing member 204, as is evident from FIGS. 8 and 9.

In FIG. 8, a sensing pin 217 is moved toward the inoperative position by the firm tobacco filling at the end face 219 of a cigarette C2 under a force generated by the engagement of a fixed backing pin 216 with the impenetrable end face 220 of the filter F. In FIG. 9, the same force merely causes penetration of the insufficiently filled end face 219 of a cigarette C3 by the reduced terminal portion of a pin 217, and generates a signal for the removal of the cigarette C3 when it reaches the classifying station.

When the end faces 219 of the cigarettes face the testing unit 203 with its radially movable pins 217, all cigarettes, regardless of the firmness of their tobacco filling, are discharged in an aligned row, as will be evident from inspection of FIGS. 8 and 9, and this row will be laterally offset by a small distance from the row of cigarettes aligned by the guide rails 213, 213a prior to entering the testing stations T1, T2.

The apparatus shown in FIGS. 6 to 9 is capable without modification of detecting defects in either end of a cigarette which affect the resistance of the end face to penetration. A plain cigarette in which the tobacco filling extends from one end face to the other end face is rejected if the tobacco filling at either end face lacks the desired firmness. In a filter cigarette, the absence of a filter, or a defective filter penetrable by one of the pins 216, 217 causes a signal to be generated for removal of the defective cigarette from the conveyor.

While the operation of the automatic testing apparatus of FIGS. 6 to 9 has been illustrated and described in cooperation with a testing unit substantially identical with the unit 76 shown in FIGS. 2 to 5, it will be appreciated that the backing arrangement including a rotatable backing member 204 carrying fixed circumferentially spaced pins 216 can be combined unchanged with the testing and classifying units illustrated in FIG. 1 to replace the belt 65 and pulley 67, and such a combination is specifically contemplated.

The apparatus disclosed is not limited in its utility to the inspection and sorting of all types of cigarettes. It is immediately useful for or readily adapted to the inspection of other elongated articles, and more particularly of other tobacco products such as rodlike tobacco bodies manufactured as intermediate products in the production of cigars, cigarillos, cheroots and other applications which will readily suggest themselves.

The conveyer can be modified to accommodate elongated articles of different cross sectional shape and area by replacing the notched rubber belts by others having suitable notches. The axial length of different elongated articles can be accounted for by shifting the testing units, classifying units, and backing units transversely of the direction of conveyor movement in the adjustable mountings provided. The compressive stresses exerted by the sensing members during inspection may be varied by suitable choice of the springs which bias the sensing pins away from the axis of their carrier member, or by adjusting the tension of these springs. The area of the end faces of the sensing and/or backing pins is inversely related to the pressure brought to bear by the pins on the end faces of the cigarette or other article being tested, and such pins are preferably releasably mounted on the carrier to permit their replacement by other pins having end faces of different area. It is advisable to make the cross sectional area of the terminal portions of the sensing pins smaller than that of the main pin body in order to reduce the effects of wear.

Figure 10:
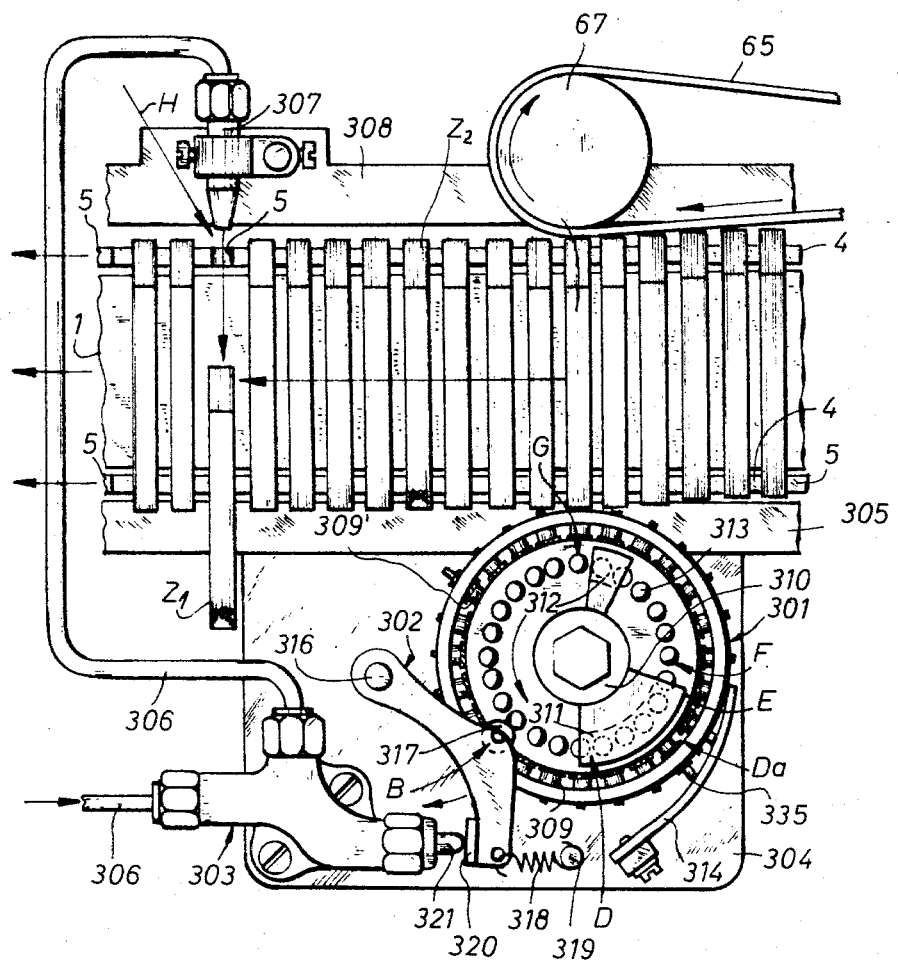
FIG. 10 is a top plan view of a testing apparatus including a modified testing unit wherein the sensing members are disengaged from the associated control members immediately before their tips engage the articles to be tested.

Referring to FIG. 10, there is shown a further testing apparatus which cooperates with a conveyor for filter cigarettes Z. The conveyor comprises a comparatively wide endless flexible belt 1, two narrow flexible belts 4 with receptacles in the form of recesses or notches 5, and drive means (not shown) for driving these belts in a manner as described in connection with FIG. 1. The upper stringers of the belts 1 and 4 travel in a horizontal path in a direction straight from a filter cigarette machine to a packing machine or to storage. Thus, in order to undergo a test, the cigarettes need not leave the path in which they normally advance from the point of manufacture to another machine or to storage. This means that the provision of our testing apparatus necessitates no changes in the construction of such machines.

At one side of the conveyor, there is provided a sensing or testing unit 301 which cooperates with a lever 302 serving to transmit impulses to and thereby to actuate a classifying or sorting unit including a normally closed control valve 303. The valve 303 is supported by a platform 304 which carries the testing unit 301 and which is fixed to a frame member 305. As shown, the valve 303 is mounted in a conduit 306 leading to an ejector nozzle 307 which is mounted at the other side of the conveyor and is carried by a frame member 308. This latter frame member 308 also supports the idler pulley 67 for the backing belt 65, and the inner stringer of the belt 65 (i.e., the lower stringer, as viewed in FIG. 10) is inclined with reference to the longitudinal direction of the belt 1 so that it comes nearest to the cigarettes Z while starting to move around the idler pulley 67. The backing belt 65 serves to exert an axial pressure against one end of each cigarette which advances past the testing station G so that the cigarette is held against axial movement in response to a predetermined compressive stress against the other end thereof which is engaged by a sensing member of the unit 301. The number of recesses 5 on one of the belts 4 between the testing station G and the ejecting or classifying station H is the same as the number of sensing members or pins 309 between the station G and a control station B at which the testing unit 301 causes the lever 302 to open the valve 303 if a defective cigarette $Z_1$ or $Z_2$ has been conveyed past the testing station G. In the illustrated embodiment, this number is ten while the testing unit 301 comprises a total of twenty-four sensing pins 309.

The testing unit 301 comprises a fixed vertical shaft 310 whose axis is coplanar with the axis of that cigarette Z or $Z_1$ which is being conveyed past the testing station G. This shaft supports two fixed cams, including a coupling cam 311 and an uncoupling cam 312, and vertical control pins 313 corresponding substantially to the control pins 91. A coupling rail 314 is fixedly supported by the platform 304 and one end portion thereof extends into the path of the sensing pins 309 so that each of these pins is depressed radially inwardly toward the axis of the shaft 310 before the sensing pins reach the testing station G. The testing unit 301 rotates in a counterclockwise direction, as viewed in FIG. 10.

The lever 302 is rotatable about a vertical pivot 316 and carries a motion transmitting roller 317 which is biased into the path of the control pins 313 because the free end of the lever 302 is connected with a resilient element 318 here shown as a helical spring which is mounted on a stud 319 carried by the platform 304. A plate 320 on the free end of the lever 302 is engaged by a reciprocable spring-biased valve member 321 of the control valve 303, and this valve member 321 is depressed into the housing of the valve 303 when a given control pin 313 causes the lever 302 to pivot in a clockwise direction, as viewed in FIG. 10. The valve member 321 then permits compressed air or another suitable gaseous fluid to flow to the nozzle 307 and to eject a defective cigarette $Z_1$ or $Z_2$ from the corresponding recesses 5.

Figure 11:
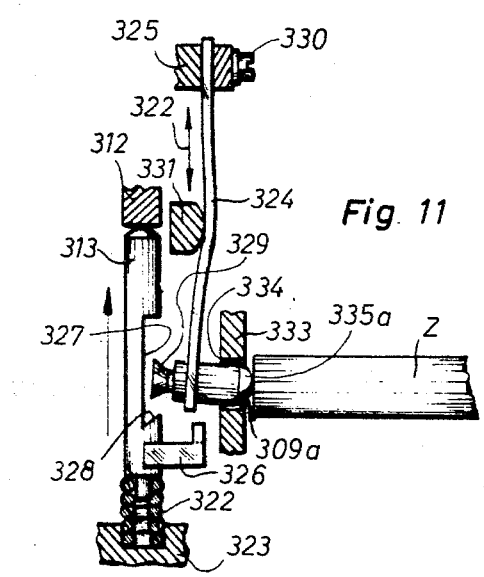
FIG. 11 is a fragmentary vertical section through a slightly different testing unit which may be used in the apparatus of FIG. 10, a single sensing member being shown in a position it assumes when engaging a satisfactory article.
Figure 12:
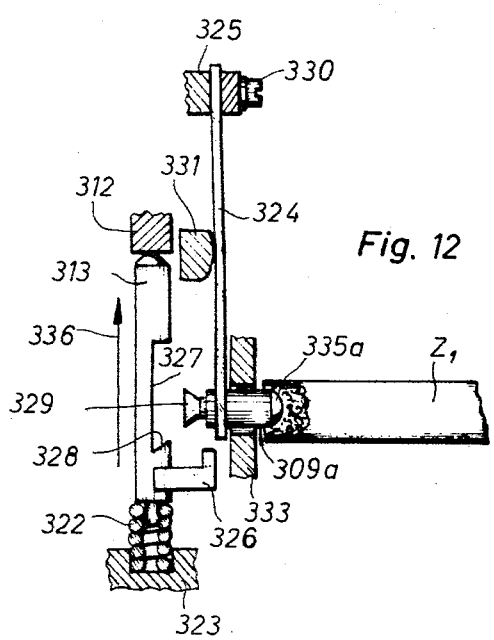
FIG. 12 is a similar vertical section showing the sensing member in engagement with a defective article.
Figure 13:
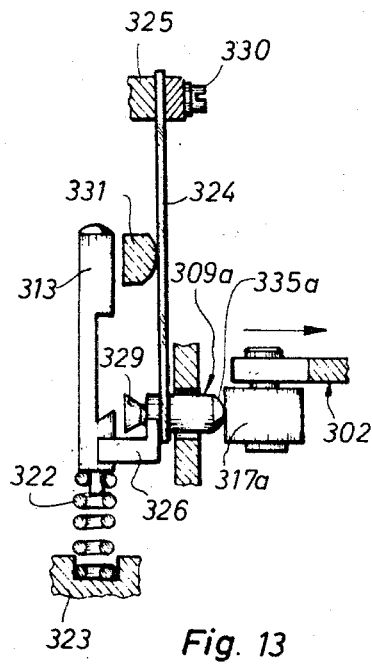
FIG. 13 is another vertical section showing the sensing member in engagement with a motion transmitting element which initiates ejection of a defective article.

The construction of a slightly different testing unit is illustrated in greater detail in FIGS. 11 to 13. Referring to FIG. 11, the control pin 313 is depressed by the uncoupling cam 312 against the bias of a return spring 322 which is mounted on a lower carrier 323, this carrier being rotatable on the shaft 310. When the control pin 313 is depressed by the cam 312, it is uncoupled from the corresponding sensing pin 309a so that the latter may be moved radially outwardly and away from the shaft 310 because it is biased by the lower portion of a holder here shown as a leaf spring 324 whose upper portion is fixed to an upper carrier 325; this latter carrier is also rotatable on the shaft 310. The control pin 313 carriers an L-shaped supporting bracket 326 and is provided with a cutout 327 bounded at its lower end by an inwardly and downwardly inclined locking face 328 adapted to engage and to hold an inwardly flaring frustoconical end portion 329 at the inner end of the sensing pin 309a. It will be noted that the leaf spring 324 is readily detachable merely by removing a screw 330 which is threaded into the upper carrier 325.

The testing unit of FIGS. 11–13 further comprises a vertically reciprocable adjusting annulus 331 (see the double-headed arrow 332) which serves to regulate the bias of the spring 324. A cylindrical stop 333 which also constitutes an element of the testing unit is provided with a radial bore 334 through which the sensing pin 309a extends. The outer terminal portion or tip of this sensing pin is of substantially semispherical shape, as indicated at 335a. The configuration of the tip 335a is different from that of the tip 335 on a sensing pin 309. Of course, the testing unit of FIGS. 11–13 comprises twenty-four control pins 313 and an equal number of parts 322, 324, i.e., the number of such parts equals the number of sensing pins 309a.

In FIG. 11, the uncoupling cam 312 has depressed the control pin 313 against the bias of the respective return spring 322 so that the inclined locking face 328 has been moved downwardly and away from the frustoconical end portion 329 whereby the spring 32 is free to move the semi-spherical tip 335a against the end face of a properly filled filter cigarette Z. The cam 312 is located slightly ahead of the testing station G so that the sensing pin 309a of FIG. 11 is free to move into actual engagement with that cigarette which approaches the testing station. The other end of the cigarette Z shown in FIG. 11 is then pressed against the inner stringer of the backing belt 65 and the tip 335a would have penetrated into the tobacco filler of this cigarette if the latter were defective. This situation is illustrated in FIG. 12 which shows that a defective cigarette $Z_1$, on passing through the testing station G, cannot prevent the tip 335a from penetrating into the tobacco filler under the bias of the spring 324 whereby the sensing pin 309a moves radially outwardly and its frustoconical inner end portion 329 is completely withdrawn from the cutout 327. Consequently, the inclined locking face 328 will bypass the end portion 329 when the control pin 313 moves past the uncoupling cam 312 (see FIG. 13) and is caused to move upwardly (arrow 336) because the spring 322 is free to expand.

The spring 324 is assisted by the bracket 326 and maintains the sensing pin 309a in radially outwardly extended position so that the tip 335a will pivot the lever 302 as soon as it engages a roller 317a. The plate 320 depresses the valve member 321 to send a blast of compressed gas through the ejector nozzle 307 whereby the blast removes the defective cigarette $Z_1$ from the conveyor. As shown in FIG. 10, the defective cigarette $Z_1$ is in registry with the ejector nozzle 307 when the sensing pin 309a of FIG. 13 has engaged the roller 317a. As the sensing pin 309a of FIG. 13 (which is uncoupled from the respective control pin 313) continues to rotate about the axis of the shaft 310, it is engaged by the coupling rail 314 which forces it radially inwardly so that it returns to the position of FIG. 11 in which its frusto-conical end portion 329 extends into the cutout 327. This is possible because the coupling cam 311 depresses the respective control pin 313 downwardly so that, and as soon as the control pin 313 advances beyond the cam 311, the end portion 329 is automatically coupled to the inclined locking face 328 to hold the pin 309a in retracted position until the control pin 313 reaches the uncoupling cam 312 which depresses it against the bias of the spring 322 so that the sensing pin 309a is free to move radially outwardly and into engagement with the end face of another cigarette on the conveyor belts 1 and 4.

It is to be noted that the lever 302 may be rocked by the control pins 313 or by the sensing pins 309 or 309a without in any way departing from the spirit of our invention. All that is necessary is to replace the roller 317a by the roller 317 which latter is then mounted in such a way that it may be engaged by a control pin 313 which is uncoupled from the respective sensing pin 309a, i.e., which is uncoupled from a sensing pin that has detected a defective cigarette $Z_1$ while advancing in that portion of its circular path which is nearest to the testing station G. This will be readily understood since such disconnected or uncoupled control pins 313 extend to a level above the level of the remaining control pins (compare FIG. 13 with FIGS. 11 and 12).

An important advantage of the testing units shown in FIGS. 10 and 11–13 is that their cams 312 uncouple the sensing pins 309 or 309a shortly before these pins reach the testing station G whereby the axis of a sensing pin which is just uncoupled from the respective control pin 313 is nearly parallel with the axis of the corresponding cigarette Z or $Z_1$. This insures that the tips 335 or 335a of the sensing pins cannot engage the cigarettes at such an angle that the sensing pins would cause displacement of cigarettes from their recesses 5 and improper alignment of cigarettes at the actual testing station. A satisfactory cigarette Z will pass the testing station without causing opening of the valve 303 so that it is not ejected by the nozzle 307. FIG. 10 illustrates that a second defective cigarette $Z_2$ is about to be ejected as soon as the sensing pin 309' reaches the control station.

The brackets 326 support the sensing pins 309a when the tips 335a are engaged by the roller 317, see FIG. 13. At the same time, the brackets 326 engage the lower ends of the springs 324 and prevent the sensing pins from yielding to the bias of the spring 318. In other words, at the time a sensing pin 309a engages the roller 317a, it cannot yield radially inwardly because it is fixed to the respective spring 324 and because the spring 324 is engaged by the annulus 331 and bracket 326. This bracket then constitutes a stop for the spring 324 and sensing pin 309a.

The stop 333 limits the extent to which the lower ends of the springs 324 may be pivoted outwardly by the adjusting annulus 331.

FIGS. 14 to 27 illustrate the operation of the testing unit 301 when the testing apparatus of FIG. 10 is in actual use. The sole difference between the testing apparatus of FIGS. 11–13 and the testing apparatus of FIG. 10 which embodies the structure shown in FIGS.

14 to 27 is that the lever 302 is provided with a differently mounted motion transmitting roller 317a which extends into the circular path of sensing pins 309a. If desired, the brackets 326 may be dispensed with when the testing unit is constructed in a manner as shown in FIGS. 10 and 14–27.

When a given sensing pin 309 advances toward the testing station G and meets the end face of a satisfactory filter cigarette Z, it is depressed radially inwardly so that its inner end portion 329 extends into the cutout 327 of the respective control pin 313. The control pin is depressed against the bias of the respective return spring 322 because it is engaged by the uncoupling cam 312. Consequently, as soon as the control pin 313 passes beyond the uncoupling cam 312 and is compelled to move upwardly, its locking face 328 engages the end portion 329 and maintains the sensing pin 309 in retracted position (FIG. 14). This means that the control pin 313 cannot move to its upper end position and its upper end will pass beneath the roller 317 so that the lever 302 remains idle and does not open the valve 303 (FIG. 15). In other words, the sensing pin 309 holds the control pin 313 against axial movement in upward direction whereas the pin 313 holds the pin 309 against axial movement radially outwardly and away from the axis of the shaft 310. The main difference between the sensing pins 309 and 309a is that the pin 309 is provided with a cylindrical terminal portion or tip 335 of reduced diameter which will penetrate more readily into the end face of an improperly filled cigarette.

As the retracted pins 309, 313 which are coupled to each other pass along the control station B of FIGURE 10, nothing happens to the lever 302 because the upper end portion of the control pin 313 cannot reach the roller 317 and the valve 303 remains closed. Consequently a satisfactory cigarette Z which has been tested by the tip 335 will advance past the ejector nozzle 307 and will remain in the respective recesses 5.

As the testing unit 301 continues to rotate, the control pin 313 reaches the coupling cam 311 (at the point indicated by a reference character D in FIG. 10) and is depressed against the bias of the spring 322 (FIG. 16) to move the locking face 328 away from the end portion 329 and to release the sensing pin 309 which latter is then moved radially outwardly because it is biased by the leaf spring 324. This happens substantially midway between the ends of the coupling cam 311 (see the reference character Da in FIG. 10) whereby the sensing pin 309 moves outwardly and its tip 335 strikes the coupling rail 314. Since the free end portion of the rail 314 extends inwardly toward the periphery of the testing unit 301, it will depress the pin 309 while the pin 313 is still depressed by the cam 311 so that, on reaching the point E (see FIG. 10), the pin 313 is free to move upwardly and is coupled to the pin 309 because the latter is depressed by the rail 314 and its inner end portion 329 extends into the cutout 327, see FIG. 17. At the point F, the pins 309, 313 are coupled to each other in a manner as shown in FIG. 18.

It will be noted that the coupling cam 311 and the coupling rail 314 could be omitted if all cigarettes were properly filled with tobacco because the position of pins 309, 313 before the control station B (FIG. 14) corresponds to that at the point F (FIG. 18). The cam 311 and rail 314 are needed solely to recouple a control pin 313 with a sensing pin 309 which has detected a defective cigarette $Z_1$ or $Z_2$.

When the thus coupled pins 309, 313 advance toward the testing station G, the upper end portion of the pin 313 engages the uncoupling cam 312 which depresses this pin against the bias of the spring 322 so that the sensing pin 309 is released. An intermediate stage in downward movement of the control pin 313 is illustrated in FIG. 19 wherein the end portion 329 is about to be uncoupled from the locking face 328. If the cigarette is satisfactory, the spring 324 is too weak and cannot force the tip 335 into a properly densified tobacco filler so that the end portion 329 remains in the cutout 327 and is again coupled to the locking face 328 as soon as the control pin 313 advances beyond the uncoupling cam 312 (FIG. 20). In other words, the pins 309, 313 will remain coupled at the testing station G provided that the tip 335 has met a properly filled cigarette Z.

As stated hereinbefore, the purpose of the uncoupling cam 312 is to release the sensing pin 309 at a time when the axis of this pin is almost parallel with the axis of the corresponding cigarette Z, $Z_1$ or $Z_2$ whereby the cigarette is subjected to comparatively small dislodging stresses such as would tend to move it in the direction of forward movement of the conveyor belts 1 and 4. Axial movement of the cigarettes is limited by the backing belt 65 and, since the cigarettes are located in the plane of the sensing pins 309, they are not likely to move upwardly and away from the recesses 5 whereby the testing operation may be carried out at high speed. Referring to FIG. 21, there is shown that, after having encountered a defective cigarette $Z_1$, the sensing pin 309 remains uncoupled from the control pin 313 because its inner end portion 329 does not extend into the cutout 327. This will be readily understood since after the control pin 313 is depressed by the cam 312 and after the spring 324 has compelled the tip 335 to penetrate into the end face of an improperly filled cigarette $Z_1$, the entire sensing pin 309 has been moved radially outwardly and has shifted its end portion 329 away from the cutout 327. This means that, after passing the uncoupling cam 312, the control pin 313 may move to its upper end position (FIG. 22) and engages the roller 317 to pivot the lever 302 and to thus open the control valve 303 which sends a blast of compressed gas into the ejector nozzle 307 to remove the defective cigarette from the conveyor.

The control pin 313 then advances toward the coupling cam 311 (point D in FIG. 10) and is depressed whereby its locking face 328 moves below the level of the end portion 329 (FIG. 23). The tip 335 of the sensing pin 309 reaches the coupling rail 314 and is moved radially inwardly (at the point Da of FIG. 10) so that the end portion 329 returns into the cutout 327 (FIG. 24) and is engaged by the locking face 328 (FIG. 25) when the control pin moves past the point E. Thus, when the pins 309, 313 move past the point F, they are coupled to each other and remain coupled until the pin 313 reaches the uncoupling cam 312 (FIG. 26). If the tip 335 then meets a satisfactory cigarette Z, the end portion 335 is depressed radially inwardly and moves back into the cutout 327 (FIG. 26) so that it is re-engaged by the locking face 328 when the control pin 313 moves beyond the cam 312. On the other hand, whenever the sensing pin 309 meets a defective cigarette $Z_1$ (FIG. 27), its end portion 329 is moved away from the cutout 327 because it is biased by the spring 324 whereby the control pin 313 is free to move to its upper end position (FIG. 21) and to pivot the lever 302 by engaging the roller 317 (FIG. 22).

It will be noted that the coupling cam 311 and coupling rail 314 serve to recouple a control pin 313 with a sensing pin 309 which has detected a defective cigarette and that the uncoupling cam 312 serves to disengage the pins 309, 313 shortly before the tip 335 of a sensing pin engages the end face of a cigarette.

The testing unit of FIGS. 28–30 is very similar to the one described in connection with FIGS. 11–13 excepting that the leaf spring 324 is replaced by a comparatively rigid holder here shown as a supporting arm 340 secured at its upper end to a bearing sleeve 341 which is rotatable about a horizontal pivot member 342. The lower end portion of this arm 340 carries the sensing pin 309a. The adjusting annulus 331 is replaced by an annulus 343 which carries radial stubs 344 for helical springs 345.

he spring shown in FIGS. 28–30 bears against an intermediate portion of the arm 340 to bias the sensing pin 309a radially outwardly and to force the tip 335a into the end face of a defective cigarette $Z_1$ (see FIG. 30) when the frustoconical inner end portion 329 is uncoupled from the locking face 328. Otherwise, the construction of this testing unit is identical with that of the testing unit shown in FIGS. 11–13.

In FIG. 28, the upper end portion of the control pin 313 is engaged by the uncoupling cam 312 so that the pin 313 compresses the spring 322 and moves its locking face 328 away from the end portion 329. The spring 345 tends to expand and biases the tip 335a against the end face of a satisfactory cigarette Z. The filler of this cigarette is dense enough to resist the bias of the spring 345 and to maintain the end portion 329 in the cutout 327. Thus, as soon as the control pin 313 advances beyond the uncoupling cam 312, the spring 322 expands and returns the locking face 328 into engagement with the similarly inclined surface of the end portion 329 whereby the pins 309a, 313 remain coupled to each other and the tip 335a bypasses the roller 317.

When the control pin 313 is depressed by the uncoupling cam 312 to release the sensing pin 309a whose tip 335a then meets the end face of an unsatisfactory cigarette $Z_1$ (FIG. 30), the tip 335a will penetrate into the filler of this cigarette and the expanding spring 345 will move the end portion 329 outwardly and away from the cutout 327. Consequently, when the control pin 313 thereupon advances beyond the uncoupling cam 312 (FIG. 29), it is free to move to its upper end position and the bracket 326 is lifted to engage the inner side of the arm 340 whereby the sensing pin 309a remains in its outer end position and rocks the lever 302 by engaging the roller 317a so that the ejector nozzle 307 (FIG. 10) sends a blast of compressed gas to remove the defective cigarette axially and at right angles to the direction of forward movement of cigarettes on the belts 1 and 4.

The arm 340 may be a hard-to-flex leaf spring which need not yield when the tip 335a engages the end face of a satisfactory cigarette Z. The adjusting annulus 343 is reciprocable up and down (arrow 346) so that the flexibility of the arm 340 varies depending on the distance between the spring 345 and the sensing pin 309a. In FIG. 29, the spring 345 has been moved upwardly so that the lower half of the arm 340 is easy to flex but the supporting bracket 326 prevents the pin 309a from moving radially inwardly when the tip 335a passes along and engages the roller 317a. On the other hand, and as shown in FIG. 30, the spring 345 moves downwardly and the lower portion of the arm 340 is more difficult to flex when the control pin 313 is depressed by the cam 312 so that the stiffness of the arm 340, assisted by the bias of the spring 345, is sufficient to move the tip 335a into the filler at the adjacent end of a defective cigarette $Z_1$. If the arm 340 is stiffened by a longitudinally extending rib or the like (not shown), and if the bias of the spring 345 is sufficient to prevent pivoting of the arm 340 in response to engagement with the roller 317a, the supporting bracket 326 may be dispensed with.

By proper selection of the spring 345 and of the material for the arm 340, one can mount the sensing pin 309a in such a way that its tip 335a cannot damage a properly filled cigarette Z. Damage to a defective cigarette $Z_1$ is of no consequence since the cigarette is subsequently destroyed to recover the filler.

If a cigarette is missing from the row of cigarettes on the conveyor belts 1 and 4, i.e., if a pair of aligned recesses 5 is empty while they advance along the testing station G, the corresponding sensing pin 309 or 309a will react the same way as when detecting a defective cigarette. Thus, the ejector nozzle 307 will send a blast of compressed gas into the space which would have accommodated the missing cigarette.

Referring to FIGS. 31 and 32, the sensing or testing unit 400 comprises a platform or base 401 which supports a rotary vertical shaft 402. This shaft is provided with a collar 403 which is connected with a detachable spacer disk 404 by means of threaded fasteners 405. The disk 404 consists of nonferrous metallic material.

An annular adjusting plate 406 has a centrally located hub 407 which is slidable on the shaft 402 and is biased by a helical expansion spring 408 whose lowermost convolution rests on the spacer disk 404.

The upper end portion 409 of the shaft 402 is provided with external threads to take a nut 410 which maintains a disk-shaped carrier 411 in abutment with an annular shoulder of the shaft 402. The carrier 411 is formed with vertical bores 412 for presser studs 413 whose lower ends bear against the upper side of the adjusting plate 406 and whose upper ends are secured to an annular holder 414 which is reciprocable along the threaded end portion 409 between an upper nut 415 and the aforementioned nut 410. The upper end portions of the presser studs 413 are screwed into tapped bores provided in the holder 414. When the spring 408 is free to expand, the holder 414 bears against the upper nut 415 which latter serves to regulate the exact position of the adjusting plate 406.

The peripheral portion of the carrier 411 supports a series of resilient holders here shown as leaf springs 417 which are secured thereto by threaded fasteners 418 and which normally abut against the peripheral surface of the adjusting plate 406. Each fastener 418 further supports a downwardly extending stop finger 419 which serves to limit the extent to which the respective spring 417 may be flexed outwardly. A cup shaped protective cover 420 (shown by a single line) rests on the carrier 411 to prevent entry of dust or other foreign matter into the interior of the testing unit 400.

The platform 401 supports a stationary member of magnetizable material here shown as a steel ring 421 whose marginal portion is of Z-shaped cross section and which is secured to the platform by threaded fasteners 422. The diameter of the ring 421 is slightly less than the diameter of the spacer disk 404. The lower end portion of each leaf spring 417 carries a permanent magnet 423 whose outwardly extending portion 423a constitutes a sensing pin and whose inwardly extending portion 423b is of greater diameter than that of the sensing pin 423a. The diameters of the sensing pins 423a are smaller than those of the cigarettes Z which are advanced by a centrally located belt 1 and by two notched or recessed belts 4 in the same way as described in connection with FIG. 1 or 10. The belts travel in the direction indicated by an arrow 424.

The marginal portion of the ring 421 which is surrounded by the sensing pins 423a is provided with a cutout 425 and the testing unit 400 further comprises a coupling rail 426 which consists of nonferrous metallic material and which is fixed to the platform 401. The rail 426 serves the same purpose as the coupling rail 314, i.e., to press the sensing pins 423a radially inwardly before the pins reach the testing station G.

A gas switch 427 is adjacent to the path of sensing pins 423a and serves to initiate ejection of a defective cigarette when it is engaged by a sensing pin 423a' which has moved radially to its outer end position. This switch 427 is positioned ahead of the couping rail 426 and its exact construction forms no part of the present invention. The peripheral speed of the testing unit 400 corresponds to the forward speed of the belts 1 and 4. The unit 400 rotates in a counterclockwise direction, as viewed in FIG. 32 (see the arrow 428).

The testing apparatus of FIGS. 31 and 32 operates as follows:

The adjusting plate 406 is shifted to a selected position by rotating the nut 415 (arrow 429) so that its periphery is adjacent to selected portions of the leaf springs 417.

When the cigarettes Z contain comparatively lightly compacted fillers, the spring 408 will be permitted to move the adjusting plate 406 upwardly. Such upward movement of the plate 406 adds to the flexibility of the lower portions of the springs 417 because the distance between the sensing pins 423a and the periphery of the plate 406 is increased. Consequently, the pins 423a cannot damage or deface the end of a comparatively soft but properly compacted filler because the springs 417 will yield before the pressure of pins 423a against the end faces of the respective cigarettes Z reaches an undesirable value. On the other hand, and when the ends of the fillers are compacted to higher density, the adjusting plate 406 will be caused to move downwardly so that the elasticity of the lower portions of the springs 417 is reduced and that the sensing pins 423a exert a greater compressive force against the ends of cigarettes as they travel past the testing station G.

The entire testing unit 400 rotates in a counterclockwise direction (arrow 428) and such rotary movement is shared by the cover 420, by the springs 417, by the magnets 423 and by the stop fingers 419. If the inner portion 423b of a magnet 423 is of positive polarity, the minus pole is located on the marginal portion of the steel ring 421 whereby the sensing pin 423a and the lower portion of the spring 417 move radially outwardly so that a median portion of the spring 417 abuts against the inwardly bent terminal portion of the respective stop finger 419. The difference in diameters of the parts 404, 421 is of advantage because the inner portions 423b of the magnets 423 cannot move into actual engagement with the ring 421, i.e., there is no friction between the magnets 423 and this ring. The difference between the diameters of the parts 404, 421 is indicated by a reference character S, and this difference has been exaggerated for the sake of clarity.

FIG. 33 illustrates a magnet 423 in the inner end position in which it abuts against the periphery of the spacer disk 404 but cannot abut against the periphery of the steel ring 421 which latter is indicated mainly by broken lines.

When a given magnet 423 reaches the testing station G (see FIG. 32), it travels along the cutout 425 which is bounded by two inclined faces 425a, 425b (see FIG. 34). While the magnet moves along the inclined face 425a, the magnetic attraction between the inner portion 423b and ring 421 decreases gradually so that the spring 417 may move the sensing pin 423a radially outwardly and into the end face of a defective cigarette $Z_1$ shown in FIGS. 31, 32 and 34. The distance between the inner portion 423b of a magnet 423 and the marginal portion of the ring 421 at the time the portion 423b travels along the inclined face 425a is indicated in FIG. 34 and is marked $S_2$. This distance increases (see the reference character $S_3$ in FIG. 35) when the inner potrion 425b of a magnet 423 travels along the bottom face 425c in the cutout 425 because the magnetic attraction between the magnet 423 and the ring 421 then reaches a minimal value. This minimal magnet attraction is insufficient to overcome the bias of the spring 417 so that the distance $S_3$ remains unchanged as the respective magnet 423 advances toward the switch 427. The showing of FIG. 34 coresponds to that of FIG. 31 or 32, i.e., the sensing pin 423a of that magnet 423 which advances past the testing station G has penetrated into the end face of a defective cigarette $Z_1$ and the magnetic attraction is then so weak that the bias of the spring 417 suffices to prevent inward movement of the magnet while the latter travels toward the switch 427. The switch 427 comprises two contacts 427a which complete an electric circuit in response to magnetic force exerted by the passing sensing pins 423a' whereby the switch 427 sends an impulse to an ejector here shown as a solenoid valve 440 to discharge a blast of compressed gas which removes the defective cigarette from its recesses 5. Owing to lack of space, the valve 440 is not shown adjacent to the conveyor belts 1 and 4 at a point downstream of the testing unit 400; however, it will be readily understood that the valve 440 may be positioned in the same way as the valve 303 of FIG. 10 and that it may control an ejector nozzle 307 which is located downstream of the backing belt 65.

As the testing unit 400 continues to rotate, the outwardly extending sensing pin 423a' of a magnet which has detected a defective cigarette $Z_1$ will be engaged by the inclined cam face 426a of the coupling rail 426 to be depressed radially inwardly and to move the inner portion 423b nearer to the marginal portion of the ring 421 so that the ring attracts the magnet 423 in a manner as shown in FIG. 33. The thus retracted sensing pin 423a then advances toward the testing station G to test a new cigarette. If this new cigarette is satisfactory (see FIGS. 36 and 37), the inner portion 423b of the magnet 423 will move radially inwardly in response to pressure of the filler in a satisfactory cigarette Z so that the magnet travels along the cutout 425 and, while moving along the second inclined face 425b, remains in the position in which it is attracted against the bias of the spring 417. Thus, as the magnet 423 continues to rotate, its sensing pin 423a passes along the switch 427 without closing the contacts 427a whereby the satisfactory cigarette Z passes the ejector nozzle and continues to advance with the conveyor belts 1 and 4 to a packing machine or to storage.

It will be noted that the operation of the testing unit 400 is analogous to that of the previously described testing units with the exception that the control pins may be dispensed with The ring 421 may be readily exchanged to be replaced by a ring having different magnetic characteristics, and the same applies for the springs 417. If desired, the switch 427 may be replaced by a different switch wherein the contacts are mechanically flexed into actual engagement with each other. The reference numerals 423a'' indicate sensing pins which have tested satisfactory cigarettes and which bypass the switch 427 without completing the circuit and which thereupon bypass the cam face 426a without actually engaging the coupling rail 426.

Referring to FIG. 38, there is shown a diagram which is intended to represent an assembly of a filter cigarette machine 500, a packing machine 501, a conveyor 502, and a testing apparatus 503. The conveyor 502 (and also the previously described conveyors) need not form part of the testing apparatus 503 since it is a standard component of the assembly and must be provided even if the articles manufactured in the machine 500 and stored or packed in the machine 501 are not tested while advancing in the path between these machines. In other words, and owing to the specific construction of our novel testing apparatus, the articles advancing from a first point (machine 500) where they are manufactured and/or assembled, and toward a distant second point 501 (where the articles are packed, stored or otherwise processed subsequent to issuing from the manufacturing machine) need not be deflected, rerouted or otherwise advanced in a specially provided path just for the purpose of undergoing a test. This means that the testing operation does not result in any longer-lasting travel of cigarettes or similar elongated rod shaped articles from the point of manufacture to a distant second point.

We wish to mention here that certain conventional testing apparatus of which we are aware at this time utilize specially constructed ocnveyors which must deflect the articles from their original path and which thereupon return tested articles into the original path. Such method of testing is often undesirable because it is quite difficult to deflect cigarettes or similar articles from a given path while the articles advance at high speed and to thereupon return the articles into the same path without risking damage to or defacing of the articles. As a rule, deflection of cigarettes from and back into a given path will cause some tobacco to fall out at the ends, or the cigarettes will become misaligned so that they cannot be properly processed by machines which follow the testing apparatus.

In the illustration of FIG. 38, the conveyor 502 advances the articles in a straight horizontal path so that the sensing members which test the ends of continuously advancing articles are located in a horizontal plane coinciding with the plane of the articles on the conveyor 502.

The assembly which is illustrated in FIG. 39 differentiates from the just described assembly in that the manufacturing machine 600 is a cigarette machine and that the conveyor 602 advances filterless cigarettes into storage, as at 601. The testing apparatus 603 (which may be constructed in accordance with any one of the previously described embodiments of our invention) is adjacent to an intermediate portion of the conveyor 602. The conveyor advances the articles in a path which is not a straight horizontal path, but such configuration of the conveyor is not or need not be due to the provision of a testing apparatus. For example, the space available in a cigarette manufacturing plant might be such that it is impossible to convey the cigarettes in a straight path. In other words, it is not the testing apparatus 603 which necessitates that the articles manufactured at 600 be conveyed in a path other than a path representing the shortest distance between the point of manufacture and a distant second point (storage 601).

Another very important feature of our invention is that, as a rule, the sensing members through which the stressing means of the improved testing apparatus subject the ends of cigarettes or similar rod shaped articles to predetermined compressive stresses need not actually carry the articles at, before, or past the testing station. Thus, the articles which are tested continue to advance with the conveyor even though they may be engaged by one or two sensing members. This can be expressed in a different way by stating that the sensing members of our testing apparatus preferably perform exclusively a testing function and that any supporting or conveying function is then purely incidental. As a result of such operation, the sensing members may be made exceptionally sensitive and will detect extremely small differences between satisfactory and defective articles. Furthermore, and since the sensing members preferably rotate in a plane which is also the plane of the articles advancing past the testing station, the likelihood of unintentional shifting of articles during testing is very remote, i.e., the instrumentalities which subsequently pack or otherwise treat or manipulate the articles will receive tested articles in optimum position so that the articles advancing past the classifying station need not be readjusted or realigned prior to entering the packing or storing station.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A method of testing cigarettes and similar elongated articles, comprising conveying the articles consecutively and sideways in a substantially straight path past a testing station; testing at least one end portion of each consecutive article for minimum resistance to a predetermined stress while the article is conveyed past said testing station; generating a signal responsive to the absence of said minimum resistance in one of said articles; and axially displacing said one article from said path in response to said signal.

2. A method of testing cigarettes and similar elongated articles, comprising conveying the articles consecutively in uniformly spaced sequence and sideways in a substantially straight path past a testing station; applying a predetermined compressive stress to at least one longitudinal end portion of each article in the direction of elongation thereof while the article moves sideways; testing said end portions for minimum resistance to the applied predetermined stress; generating a signal responsive to the absence of said minimum resistance in said end portion of a tested article; and axially displacing said tested article from said sequence responsive to said signal.

3. A method of testing cigarettes and similar elongated articles, comprising conveying the articles consecutively in uniformly spaced sequence and sideways in a substantially straight path in a direction toward a testing station; aligning said articles in said direction to form a row of aligned spaced articles; guiding said row of articles past said testing station; testing an end portion of each article for minimum resistance to a predetermined stress while the article is conveyed past said testing station; generating a signal responsive to the absence of said minimum resistance in one of said articles; and axially displacing said one article from said row in response to said signal.

4. An apparatus for detecting defects in cigarettes and similar elongated rod-shaped articles of the type having compressible end portions, comprising a testing unit; a classifying unit, conveyor means movable relative to said testing and classifying units for conveying said articles sideways in a predetermined sequence and in a path extending along said testing unit and thence along said classifying unit, said testing unit including stressing means for exerting a predetermined stress on an end portion of each one of said articles, sensing means for sensing the resistance of said articles to the stresses exerted during engagement with said sensing means, and moving means for moving said sensing means from a position located outside of said path to a position located in said path and into engagement with the end portions of consecutive articles in said path, and again to a position outside of said path; and signal generating means operatively connected to said sensing means for generating a signal responsive to detection by said sensing means of a defective article whose end portion offers less than a predetermined minimum resistance to said predetermined stress, said classifying unit including displacing means operatively connected to said signal generating means for axially displacing defective articles relative to said conveyor means responsive to the signals generated.

5. An apparatus as set forth in claim 4, wherein said conveyor means comprises two conveying members elongated in a common direction and formed with uniformly spaced recesses therein, said recesses being open in an upwardly extending direction for receiving the end portions of each article in paired respective recesses of said conveying members, said conveying members being spacedly juxtaposed, and said paired recesses being aligned transversely of said common direction, and drive means for jointly moving said conveying members in said common direction.

6. An apparatus as set forth in claim 5, wherein said conveyor means further includes a support member interposed between said conveying members to support the respective portions of the articles intermediate said end portions.

7. An apparatus as set forth in claim 6, wherein said conveyor means additionally includes means for moving said support member in said common direction jointly with said conveying members.

8. An apparatus as set forth in claim 5, wherein said conveyor means further includes a support member interposed between said conveying members to support the respective portions of the articles intermediate said end portions, said support member being operatively connected to said drive means for joint movement with said conveying members.

9. An apparatus as set forth in claim 4, wherein said testing unit and said conveyor means jointly define a testing station, said sensing means including a sensing member and said moving means being arranged to move said sensing member in an arcuate path, the path in which said conveyor means conveys said articles to said testing unit and thence to said classifying unit being substantially tangential to said arcuate path at said testing station.

10. An apparatus as set forth in claim 9, including motion transmitting means connecting said conveyor means and said moving means for movement of said articles and of said sensing member at said testing station at substantially the same velocity.

11. An apparatus as set forth in claim 9, wherein said conveyor means includes guide means for positioning a longitudinal end face of each of said articles at a predetermined point relative to said arcuate path when said article is at said testing station while being conveyed along said tangential path, said sensing member having a terminal portion and being movable transversely of said arcuate path thereof between an operative position in which said terminal portion extends inward of said end face beyond said predetermined point, and an inoperative position in which said terminal portion is spaced outward of said end face from said operative position thereof, said stressing means comprising means urging said terminal portion of said sensing member toward the operative position thereof, said signal generating means comprising means responsive to the operative position of said terminal portion when the sensing member is at said testing station for generating said signal.

12. An apparatus as set forth in claim 11, wherein said signal is an electrical signal.

13. An apparatus as set forth in claim 11, wherein said signal is a mechanical signal.

14. An apparatus for detecting defects in cigarettes and similar elongated rod-shaped articles of the type having compressible end portions, comprising conveyor means arranged to move in a predetermined direction; a plurality of receptacle means on said conveyor means uniformly spaced in said direction for respectively receiving a plurality of said articles, said articles when received in said receptacle means being elongated in a common direction transverse of said predetermined direction, and the received articles forming a row when said conveying means moves in said predetermined direction; a carrier rotatable about an axis transverse to said predetermined direction and said common direction of elongation adjacent said row; a plurality of sensing members angularly spaced about the axis of said carrier for rotation therewith and for sequential alignment in a radially extending plane transverse of said predetermined direction and substantially parallel to said common direction, said sensing members being movable on said carrier in said plane between respective operative positions in which said sensing members project into said row, and respective inoperative positions spaced from said operative positions in a direction away from said row; resilient means urging each of said sensing members toward the respective operative position for engagement with the end portions of corresponding articles in said row; classifying means responsive to the operative position of said sensing members when in said plane for axially displacing the corresponding articles relative to the receptacle means receiving the same; and drive means synchronously driving said conveyor means in said predetermined direction and rotating said carrier about said axis for sequential alignment of said sensing members and of said articles, each of said sensing members being aligned with said plane simultaneously with a corresponding one of said articles.

15. An apparatus as set forth in claim 14, wherein said classifying means includes signal generating means responsive to the operative position of said sensing members when in said plane to generate a signal, and displacing means responsive to said signal for movement relative to said receiving receptacle means.

16. An apparatus as set forth in claim 14, wherein said conveyor means comprises a belt conveyor including a belt member and a plurality of pulleys, said belt member being trained around said pulleys, said receptacle means including two belt means, each belt means being trained around at least one of said pulleys in driving engagement therewith for joint movement of said belt means with said belt member between two of said pulleys, each of said belt means being formed with uniformly spaced upwardly open recesses, the recesses in one of said belt means being aligned with the recesses of the other belt means transversely to the direction of said joint movement, each recess of one belt means jointly with an aligned recess of the other belt means constituting one of said receptacle means.

17. An apparatus as set forth in claim 14, wherein said classifying means includes electrical switch means responsive to the operative position of said sensing members in said plane for generating an electrical signal, and displacing means responsive to said signal after a predetermined delay for displacing the corresponding article from the receptacle means receiving the same.

18. An apparatus as set forth in claim 17, wherein said displacing means includes a source of compressed gas, nozzle means adjacent said path at a point thereof spaced from said plane in said predetermined direction for directing a jet of compressed gas toward said row, and valve means responsive to said signal with said predetermined delay to connect said source with said nozzle means when said drive means has moved the receptacle means receiving the corresponding article from said plane to said point.

19. An apparatus for detecting defects in cigarettes and similar elongated articles of the type having compressible end portions, comprising a support; two belt members elongated in a common direction and spaced from each other transversely to said direction, said belt members being longitudinally movable on said support and each belt member being formed with a plurality of longitudinally spaced recesses transversely aligned with corresponding recesses of the other belt member, two corresponding recesses constituting a receptacle for one of said articles, and said belt members jointly defining a longitudinal plane; a first carrier provided on said support adjacent one of said belt members and rotatable about an axis transverse to said plane, said carrier being spaced from said one belt member in a direction away from the other belt member; a sensing member having a free end portion and being mounted on said carrier for rotation therewith in a first plane transverse to said longitudinal plane and including said axis, said sensing member being radially movable on said first carrier substantially in said transverse plane between an operative position of engagement with the end portion of an article in which said free end portion is adjacent said one belt member and remote from said axis, and an inoperative position in which said free end portion is remote from said one belt member and adjacent said axis; resilient means urging said sensing member to move radially away from said axis and into engagement with the end portion of an article; switch means connected to said sensing member for generating an electrical signal when said sensing member is in said operative position thereof; a second carrier rotatable about an axis and spaced a predetermined distance from said first carrier in the direction of longitudinal movement of said belt members, said second carrier being formed with a radially extending passage having an orifice for radially projecting a jet of fluid under pressure substantially in said longitudinal plane; a source of fluid under pressure;

a conduit communicating with said source of fluid and arranged to communicate with said passage when said orifice is located substantially in a second plane transverse to said longitudinal plane and including the axis of said second carrier; a valve member interposed in said passage between said conduit and said orifice and movable for opening and closing said passage; an electrically operated valve actuator in circuit with said switch means and operatively connected to said valve member for opening said passage responsive to said signal when said orifice is spaced from said last mentioned plane by a predetermined angle of rotation; and drive means for synchronously driving said belt members over said predetermined distance and for rotating said second carrier through said predetermined angle.

20. An apparatus as set forth in claim 19, further comprising guide means for guiding articles received in said receptacles in a path toward a predetermined position of a longitudinal end portion thereof relative to said first carrier when passing through said first transverse plane during said longitudinal movement of said belt members.

21. An apparatus as set forth in claim 20, wherein said path is substantially tangential to a circle about the axis of said first carrier in said first transverse plane.

22. An apparatus as set forth in claim 20, further comprising a third carrier rotatable adjacent said other belt member about an axis transverse of said longitudinal plane and substantially in said first transverse plane, a backing member having a free end portion radially projecting from said third carrier and mounted thereon for joint rotation through said first transverse plane, said third carrier being operatively connected to said drive means for synchronous rotation of said third carrier about the axis thereof in such a manner that the free end portions of said backing member and of said sensing member simultaneously pass through said first transverse plane, said end portions facing each other when passing through said first transverse plane, and said belt members being interposed between said end portions.

23. An apparatus for detecting defects in cigarettes and similar elongated articles of the type having compressible end portions, comprising a support; two belt members elongated in a common direction and spaced from each other transversely to said direction, said belt members being longitudinally movable on said support and each belt member being formed with a plurality of longitudinally spaced recesses transversely aligned with corresponding recesses of the other belt member, two corresponding recesses constituting a receptacle for one of said articles and said belt members jointly defining a longitudinal plane; a carrier provided on said support adjacent one of said belt members and rotatable about an axis transverse to said plane, said carrier being spaced from said one belt member in a direction away from the other belt member; a sensing member having a free end portion and being mounted on said carrier for rotation therewith through a plane transverse to said longitudinal plane and including said axis, said sensing member being radially movable on said carrier in said transverse plane between an operative position of engagement with the end portion of an article in which said free end portion is remote from said axis and adjacent said one belt member, and an inoperative position in which said free end portion is remote from said one belt member and adjacent said axis; resilient means urging said sensing member to move radially away from said axis and into engagement with the end portion of an article; a control member spaced from said axis and slidable on said carrier in an axially extending direction toward and away from an active position, and engageable with said sensing member for blocking movement of said control member toward the active position thereof when said control member is in a predetermined angular position relative to said one belt member and when the sensing member moves in said transverse plane from said operative to said inoperative position thereof; resilient means for moving said control member into the active position thereof when not blocked by said sensing member; a motion transmitting member movably mounted on said support for abutting engagement with said control member when the same is in said active position thereof while passing through a position spaced from said predetermined angular position thereof by a predetermined angle; nozzle means adapted to be opened for discharging a jet of fluid under pressure transversely to said belt members substantially in said longitudinal plane at a point thereof spaced a predetermined distance in the direction of said longitudinal movement from said transverse plane; nozzle actuating means operatively connected to said motion transmitting member for opening said nozzle means responsive to said abutting engagement of said motion transmitting member with said control member; and drive means for simultaneously moving said belt members over said predetermined distance and for rotating said carrier through said predetermined angle.

24. An apparatus as set forth in claim 23, further comprising a second carrier rotatable adjacent said other belt member about an axis transverse to said longitudinal plane and substantially in said transverse plane, a backing member having a free end portion projecting from said second carrier and mounted thereon for joint rotation through said transverse plane, said second carrier being operatively connected to said drive means for synchronous rotation about the axis thereof in such a manner that the free end portions of said backing member and of said sensing member simultaneously pass through said transverse plane, said end portions facing each other when passing through said transverse plane, and said belt members being interposed between said end portions.

25. An apparatus as set forth in claim 14, wherein said classifying means is responsive to the operative position of said sensing member when said sensing member has moved a predetermined angular distance from said plane for displacing the corresponding article relative to the receptacle means receiving the same.

26. A method of detecting defects in cigarettes and similar elongated rod shaped articles of the type having compressible end portions, comprising the steps of conveying the articles consecutively in a path extending from the point of manufacture of such articles to a distant second point so that the articles advance in a direction transverse to the longitudinal extensions thereof; testing the end portion of each consecutive article for minimum resistance to a predetermined stress while the articles advance past a testing station and toward said second point; generating a signal whenever a defective article advancing past said testing station offers less than a minimum resistance to said predetermined stress; and displacing in response to said signals defective articles in the direction of elongation thereof from said path at a classifying station located between said testing station and said second point.

27. A method as set forth in claim 26, wherein each defective article is displaced by a blast of compressed gaseous fluid.

28. A method as set forth in claim 26, wherein said path is a straight path and wherein each article advancing past said testing station remains in said straight path during testing thereof.

29. A method of detecting defects in cigarettes and similar elongated rod shaped articles of the type having compressible end portions, comprising the steps of conveying the articles consecutively in a path extending from the point where the articles are manufactured to the distant second point so that the articles advance in a common plane and in a direction transverse to the longitudinal extensions thereof; testing one end portion of each consecutive article for minimum resistance to a predetermined compressive stress acting in said common plane while the articles advance in said path past a testing station and towards said second point; generating a signal whenever a defective article advancing past said testing station offers less than a minimum resistance to said predetermined compressive stress; and axially ejecting defective articles from said path and in response to such signals while the defective articles advance between said testing station and said second point.

30. A method as set forth in claim 29, wherein the articles are tested by sensing members which rotate in said common plane laterally adjacent to said path and each of which exerts said predetermined compressive stress upon an article while moving along said testing station, and further comprising the step of rotating said sensing members at the speed at which the articles advance in said path.

31. A method as set forth in claim 30, further comprising the step of exerting an axial pressure against the other end portion of each article while the article advances past said testing station so that the article is held against axial movement in response to said predetermined compressive stress against said one end thereof.

32. In a machine for manufacturing and processing cigarettes and similar elongated rod shaped articles of the type having compressible end sections, in combination, a conveyor arranged to move along a substantially straight line and to advance the articles consecutively in a predetermined sequence and sideways in an elongated substantially straight path; and a stationarily mounted testing apparatus for testing the articles for defects, said testing apparatus comprising a testing unit adjacent to said path and including stressing means for exerting a predetermined stress on an end portion of each consecutive article advancing in said path, sensing means for sensing the resistance of consecutive articles to the stress exerted, moving means for moving said sensing means into and from the said path and into and from compressive engagement with the end portions of consecutive articles, signal generating means operatively connected with said sensing means for generating a signal responsive to detection by said sensing means of a defective article whose end portion offers less than a minimum resistance to said predetermined stress, and a stationarily mounted classifying unit adjacent to said path and including ejector means operatively connected with said signal generating means for axially removing defective articles from said conveyor in response to the signal generated.

33. A combination as set forth in claim 32, wherein said conveyor is arranged to advance consecutive articles in a common plane, said stressing means being arranged to exert said predetermined stress through the intermediary of said sensing means in said common plane and in the longitudinal direction of articles which are conveyed past said testing unit.

34. In a machine for manufacturing and processing cigarettes and similar rod shaped articles of the type having compressible end portions, in combination, a conveyor arranged to advance consecutive articles in a predetermined sequence and in an elongated path having a straight portion in which the articles are located in a common plane, said conveyor comprising receptacle means receiving the articles in such a way that the direction of forward movement is substantially perpendicular to the longitudinal extensions of the articles; and an apparatus for testing the end portions of articles on said conveyor, said apparatus including backing means laterally adjacent to said straight portion of said path so that one end portion of each article advances past said backing means, and a sensing member arranged to rotate in said common plane opposite said backing means, said sensing member being rotatable in a circular path into and out of compressive engagement with the other end portions of consecutive articles and the path of the one end portions of articles advancing past said backing means being tangential to said circular path so that the end portions of an article advancing in said straight portion of said first mentioned path may be engaged by said backing means and said sensing member.

35. A combination as set forth in claim 34, further comprising drive means for driving said conveyor, said backing means and said sensing member at identical speeds and in the same direction when said sensing member and said backing means engage the respective end portions of an article in said straight portion of said first mentioned path so that the article remains in the respective receptacle means.

36. A combination as set forth in claim 35, further comprising biasing means arranged to urge said sensing member radially outwardly while the sensing member engages the other end portion of an article.

37. A combination as set forth in claim 36, wherein said apparatus further comprises control means arranged to engage and to hold the sensing member against radial movement in response to the action of said biasing means, and means for uncoupling said control means from said sensing member shortly before said sensing member engages the other end portion of an article so that the direction of radial movement of said sensing member under the action of said biasing means is substantially parallel with the longitudinal extension of the article which is engaged by said sensing member.

38. A combination as set forth in claim 37, wherein said testing apparatus comprises coupling means for moving said sensing member radially inwardly and against the action of said biasing means after the sensing member is moved away from an article in said first mentioned path so that the sensing member may be coupled with said control means.

39. A combination as set forth in claim 36, wherein said biasing means is a spring and further comprising adjusting means for regulating the bias of said spring.

40. In a machine for manufacturing and processing cigarettes and similar rod shaped articles of the type having compressible end portions, in combination, a conveyor arranged to advance consecutive articles forwardly in a predetermined sequence and in an elongated path in which the longitudinal extensions of the articles are substantially perpendicular to the direction of forward movement; and an apparatus for testing the end portions of articles on said conveyor, said apparatus comprising backing means laterally adjacent to said conveyor so that one end portion of each article advances past said backing means, a testing unit laterally adjacent to said conveyor and located opposite said backing means, said testing unit comprising carrier means rotatable about an axis which is perpendicular to the longitudinal extensions of the articles, a plurality of circularly arranged sensing members supported by said carrier means and reciprocable radially of said axis, said sensing members being arranged to rotate continuously in a circular path a first portion of which is closely adjacent to said conveyor so that the other end portion of each article may be engaged by a sensing member when the one end portion of the same article is engaged by and moves along said backing means, resilient means mounted on said carrier means and arranged to bias said sensing members radially outwardly whereby the extent of outward movement of said sensing members depends on the resistance offered by the other end portions of articles during engagement with said sensing members and said backing means, and ejector means operatively connected with said testing unit and arranged to remove from said conveyor defective articles whose other end portions offer less than a predetermined minimum resistance to outward movement of said sensing members.

41. A combination as set forth in claim 40, wherein said testing unit further comprises adjusting means for regulating the bias of said resilient means.

42. A combination as set forth in claim 40, wherein said testing unit further comprises a plurality of control members mounted in said carrier means, one for each of said sensing members and each comprising locking means arranged to hold the respective sensing member against outward movement along a second portion of said circular path located ahead of said first portion, and uncoupling means for disconnecting said locking means from the sensing members in said first portion of said path so that the sensing members are free to move radially outwardly at the time the direction of their outward movement is substantially parallel with the longitudinal extension of the article to be engaged thereby.

43. A combination as set forth in claim 42, further comprising means for coupling said control members with the respective sensing members while the sensing members advance in a third portion of said circular path located past said first portion and ahead of said second portion.

44. A combination as set forth in claim 42, wherein said control members are reciprocable in the axial direction of said carrier means between a first position in which they are coupled with and a second position in which they are uncoupled from the respective sensing members, said sensing members being uncoupled from the respective control members in said first portion of said path only when a sensing member detects a defective article.

45. A combination as set forth in claim 44, further comprising motion transmitting means arranged to operate said ejector means in response to engagement by a sensing member which is uncoupled from the respective control member after leaving said first portion of said circular path.

46. A combination as set forth in claim 44, further comprising motion transmitting means arranged to operate said ejector means in response to engagement by a control member which is uncoupled from the respective sensing member after the sensing member leaves said first portion of said circular path.

47. In a machine for manufacturing and processing cigarettes and similar rod shaped articles of the type having compressible end portions, in combination, a conveyor arranged to advance consecutive articles forwardly in a predetermined sequence and in an elongated path in which the longitudinal extensions of the articles are substantially perpendicular to the direction of forward movement; and an apparatus for testing the end portions of articles on said conveyor, said apparatus comprising backing means laterally adjacent to said conveyor so that one end portion of each article advances past said backing means, a testing unit laterally adjacent to said conveyor and located opposite said backing means, said testing unit comprising carrier means rotatable about an axis which is perpendicular to the longitudinal extensions of the articles, a plurality of circularly arranged sensing members supported by said carrier means and reciprocable radially of said axis, said sensing members being arranged to rotate continuously in a circular path a first portion of which is closely adjacent to said conveyor so that the other end portion of each article may be engaged by a sensing member when the one end portion of the same article is engaged by and moves along said backing means, resilient means mounted on said carrier means and arranged to bias said sensing members radially outwardly whereby the extent of outward movement of said sensing members depends on the resistance offered by the other end portions of articles during engagement with said sensing members and said backing means, and ejector means operatively connected with said testing unit and arranged to remove from said conveyor defective articles whose other end portions offer less than a predetermined minimum resistance to outward movement of said sensing members, each of said sensing members comprising a permanent magnet and said testing unit further comprising a stationary member of magnetizable material having a marginal portion surrounded by said sensing members, said marginal portion having a cutout located opposite said backing means so that the magnetic attraction between said stationary member and said sensing members is reduced when a sensing member passes along said cutout, the magnetic attraction between said marginal portion and said sensing members being such that the sensing member engaging the other end portion of a satisfactory article remains attracted by said marginal portion against the bias of said resilient means whereas a sensing member engaging the other end portion of a defective article and moving radially outwardly under the bias of said resilient means remains spaced from said marginal portion to produce a signal which initiates removal of defective article by said ejector means.

48. A combination as set forth in claim 47, further comprising coupling means located past said cutout, as seen in the direction of rotation of said sensing members, for returning a sensing member which has detected a defective article into the range of magnetic attraction by the marginal portion of said stationary member before such sensing member reaches said first portion of said circular path.

49. A combination as set forth in claim 48, wherein a portion of said cutout is bounded by two inclined faces so that the magnetic attraction between said sensing members and said marginal portion first decreases and thereupon increases gradually while a sensing member rotates along said cutout.

50. A combination as set forth in claim 48, wherein said coupling means comprises a fixed cam outwardly adjacent to the circular path of said sensing members and located ahead of said first portion of said circular path.

51. A combination as set forth in claim 48, wherein said testing unit further comprises an electric switch connected in circuit with said ejector means and having normally open contacts of magnetizable material located at such distance from said sensing members that a sensing member which is not attracted by said marginal portion closes said contacts while advancing toward said first portion of said circular path whereby said switch initiates removal of the defective article from said conveyor.

52. A combination as set forth in claim 48, wherein said resilient means comprises a plurality of leaf springs, one for each of said sensing members and each having ends respectively secured to a sensing member and to said carrier means.

53. A combination as set forth in claim 52, wherein said testing unit further comprises stop means arranged to determine maximum movement of sensing members radially outwardly of said axis by engaging said springs, and adjusting means for regulating the flexibility of said springs, said adjusting means engaging each of said springs at a point intermediate the respective stop means and that end of the respective spring which is secured to said carirer means.

54. A testing unit for cigarettes and similar rod shaped articles of the type having compressible end portions, comprising a carrier arranged to rotate about a fixed axis; a plurality of equidistant leaf springs having upper ends secured to said carrier; a permanent magnet secured to each spring at a level below said carrier and said magnets being located in a common plane which is perpendicular to said axis; a stationary member of magnetizable material having a marginal portion inwardly adjacent to said magnets and provided with a cutout, said marginal portion normally attracting said magnets against the bias of said springs and its attraction upon a given magnet being less when said given magnet rotates along said cutout.

55. A testing unit as set forth in claim 54 further comprising coupling means including a fixed cam outwardly adjacent to said magnets and located past said cutout, as seen in the direction of rotation of said magnets, to move said magnets radially inwardly against the bias of said springs and into the range of magnetic attraction of said marginal portion.

56. A testing unit for cigarettes and similar rod-shaped articles of the type having compressible end portions, comprising a carrier arranged to rotate about a fixed axis; a plurality of equidistant arms having upper ends pivotally secured to said carrier so that the lower end of each arm is movable radially toward and away from the axis of said carrier; a sensing member secured to the lower end of each arm; resilient means arranged to bias said arms radially outwardly; stop means for limiting outward movement of said arms; and a plurality of control members, one for each sensing member and each mounted on said carrier for reciprocation in a direction substantially parallel with said axis, said control members and said sensing members being provided with locking means arranged to couple the cooperating members to each other in one axial position of the respective control members and to permit movement of said sensing members radially outwardly in another axial position of said control members.

57. A testing unit as set worth in claim 56, further comprising supporting means secured to said control members and arranged to engage the lower ends of the respective arms in the other position of said control members to prevent inward movement of said sensing members.

58. A testing unit as set forth in claim 56, wherein said arms are comparatively rigid leaf springs and wherein said resilient means comprises a helical spring for each of said arms, said testing unit further comprising and adjusting member supporting said helical springs and reciprocable in the axial direction of said carrier so that the points at which the helical springs engage the respective leaf springs may be shifted between the ends of said leaf springs to regulate the flexibility of the lower portions of the leaf springs.

59. An apparatus for testing cigarettes and similar elongated rod-shaped articles having compressible end portions, comprising conveyor means movable along a substantially straight line for advancing the articles sideways so that one end portion of each article travels in a predetermined substantially straight path; stationarily mounted sensing means including a plurality of sensing members and means for moving said sensing members consecutively from a position located outside of said path into a position located in said path so that the sensing members engage the one end portion of consecutive articles to sense the degree of resistance to mechanical deforming stresses, and again out of said path; means for generating a signal whenever the degree of resistance offered by an end portion to mechanical deforming stresses is less than a predetermined resistance; and means actuated by said signal generating means for axially displacing all such articles whose testing has resulted in the generation of a signal.

References Cited by the Examiner
UNITED STATES PATENTS

| | | | |
|---|---|---|---|
| 1,832,062 | 11/1931 | Thompson | 209—88 |
| 1,977,239 | 10/1934 | Molins | 209—79 |
| 2,245,263 | 6/1941 | Dostal | 198—131 |
| 2,284,117 | 5/1942 | Best | 209—79 X |
| 2,715,958 | 8/1955 | Lindstrom | 198—131 |
| 3,024,905 | 3/1962 | Casler | 209—88 X |
| 3,080,054 | 3/1963 | Pickison | 209—88 |

M. HENSON WOOD, Jr., *Primary Examiner.*

ERNEST A. FALLER, *Examiner.*